US009280004B2

(12) United States Patent
Yagi et al.

(10) Patent No.: US 9,280,004 B2
(45) Date of Patent: Mar. 8, 2016

(54) METHOD FOR MANUFACTURING SEMICONDUCTOR MODULATOR AND SEMICONDUCTOR MODULATOR

(71) Applicant: SUMITOMO ELECTRIC INDUSTRIES, LTD., Osaska-shi, Osaka (JP)

(72) Inventors: Hideki Yagi, Machida (JP); Takamitsu Kitamura, Fujisawa (JP); Hirohiko Kobayashi, Machida (JP); Yoshihiro Yoneda, Isehara (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/229,089

(22) Filed: Mar. 28, 2014

(65) Prior Publication Data
US 2014/0294335 A1     Oct. 2, 2014

(30) Foreign Application Priority Data

Mar. 29, 2013   (JP) ................................ 2013-073342

(51) Int. Cl.
  *G02F 1/025* (2006.01)
(52) U.S. Cl.
  CPC ...................................... *G02F 1/025* (2013.01)
(58) Field of Classification Search
  CPC ..................................................... G02F 1/025
  See application file for complete search history.

(56) References Cited

U.S. PATENT DOCUMENTS

| 4,361,887 A | * | 11/1982 | Nakamura et al. ........... 372/50.1 |
| 4,693,543 A | * | 9/1987 | Matsumura et al. ........... 385/14 |
| 5,042,045 A | * | 8/1991 | Sato ........................... 372/46.01 |
| 5,084,893 A | * | 1/1992 | Sekii et al. ................. 372/46.01 |
| 5,135,606 A | * | 8/1992 | Kato et al. ....................... 216/20 |
| 5,473,120 A | * | 12/1995 | Ito et al. ......................... 174/264 |
| 5,499,259 A | * | 3/1996 | Makita .................... 372/45.012 |
| 5,658,824 A | * | 8/1997 | Itoh et al. .......................... 438/38 |

(Continued)

FOREIGN PATENT DOCUMENTS

| JP | 2005332928 A | * | 12/2005 | .............. H05K 3/46 |
| JP | 2008-205025 | | 9/2008 | |

(Continued)

OTHER PUBLICATIONS

K. Tsuzuki, et al., "40 Gbit/s n-i-n InP Mach-Zehnder modulator with a π voltage of 2.2 V" Electronic Letters, $2^{nd}$ Oct. 2003, vol. 39, No. 20.

*Primary Examiner* — Peter Radkowski
(74) *Attorney, Agent, or Firm* — Smith, Gambrell & Russell, LLP.

(57) ABSTRACT

A method for manufacturing a semiconductor modulator includes the steps of preparing a substrate having a main surface including first and second areas; forming a stacked semiconductor layer on the main surface; forming an optical waveguide mesa by etching the stacked semiconductor layer using a mask, the optical waveguide mesa including an optical modulation portion; applying a resin on a top surface and a side surface of the optical waveguide mesa and on the substrate; forming a first opening in the resin on the second area of the substrate; forming an underlayer structure on the second area of the substrate in contact with the substrate; and forming a pad electrode on the underlayer structure in contact with the underlayer structure through the first opening of the resin. The underlayer structure includes an insulating layer made of a dielectric material.

13 Claims, 22 Drawing Sheets

(56) References Cited

U.S. PATENT DOCUMENTS

| | | | |
|---|---|---|---|
| 6,687,039 B2* | 2/2004 | Shirai | 359/254 |
| 7,024,057 B2* | 4/2006 | Li et al. | 385/3 |
| 7,174,059 B2* | 2/2007 | Oikawa et al. | 385/3 |
| 7,260,280 B2* | 8/2007 | Ichioka et al. | 385/8 |
| 7,482,617 B2* | 1/2009 | Yamamoto et al. | 257/12 |
| 7,657,146 B2* | 2/2010 | Laval et al. | 385/131 |
| 7,751,456 B2* | 7/2010 | Kawasaki et al. | 372/46.01 |
| 7,804,870 B2* | 9/2010 | Takada et al. | 372/46.01 |
| 8,124,543 B2* | 2/2012 | Yagi et al. | 438/737 |
| 8,358,891 B2* | 1/2013 | Shimizu et al. | 385/40 |
| 8,483,524 B2* | 7/2013 | Li et al. | 385/14 |
| 8,618,638 B2* | 12/2013 | Yoneda et al. | 257/623 |
| 8,643,929 B2* | 2/2014 | Gill et al. | 359/259 |
| 8,648,435 B2* | 2/2014 | Konno | 257/432 |
| 8,693,811 B2* | 4/2014 | Morini et al. | 385/3 |
| 8,724,933 B2* | 5/2014 | Takagi | 385/3 |
| 8,948,606 B2* | 2/2015 | Tanaka et al. | 398/180 |
| 2004/0052442 A1* | 3/2004 | Li et al. | 385/3 |
| 2005/0271313 A1* | 12/2005 | Oikawa et al. | 385/3 |
| 2006/0209914 A1* | 9/2006 | Takada et al. | 372/46.01 |
| 2006/0219996 A1* | 10/2006 | Yamamoto et al. | 257/12 |
| 2006/0269184 A1* | 11/2006 | Ichioka et al. | 385/2 |
| 2008/0197377 A1* | 8/2008 | Sudo et al. | 257/99 |
| 2008/0240191 A1* | 10/2008 | Takada et al. | 372/44.01 |
| 2008/0260320 A1* | 10/2008 | Laval et al. | 385/2 |
| 2008/0280386 A1* | 11/2008 | Kawasaki et al. | 438/39 |
| 2010/0040322 A1* | 2/2010 | Li et al. | 385/3 |
| 2010/0227170 A1* | 9/2010 | Endo et al. | 428/413 |
| 2010/0244167 A1* | 9/2010 | Konno | 257/432 |
| 2010/0260461 A1* | 10/2010 | Shimizu et al. | 385/130 |
| 2010/0303115 A1* | 12/2010 | Yagi et al. | 372/46.012 |
| 2011/0170161 A1* | 7/2011 | Gill et al. | 359/259 |
| 2011/0308848 A1* | 12/2011 | Ito et al. | 174/260 |
| 2012/0033910 A1* | 2/2012 | Morini et al. | 385/3 |
| 2012/0070156 A1* | 3/2012 | Tanaka et al. | 398/175 |
| 2012/0142129 A1* | 6/2012 | Tsuji | 438/32 |
| 2012/0148184 A1* | 6/2012 | Yoneda et al. | 385/2 |
| 2012/0314725 A1* | 12/2012 | Nakanishi et al. | 372/43.01 |
| 2013/0016939 A1* | 1/2013 | Takagi | 385/3 |

FOREIGN PATENT DOCUMENTS

| | | | |
|---|---|---|---|
| JP | 2010278154 A | * | 12/2010 |
| JP | 2012252290 A | * | 12/2012 |

\* cited by examiner

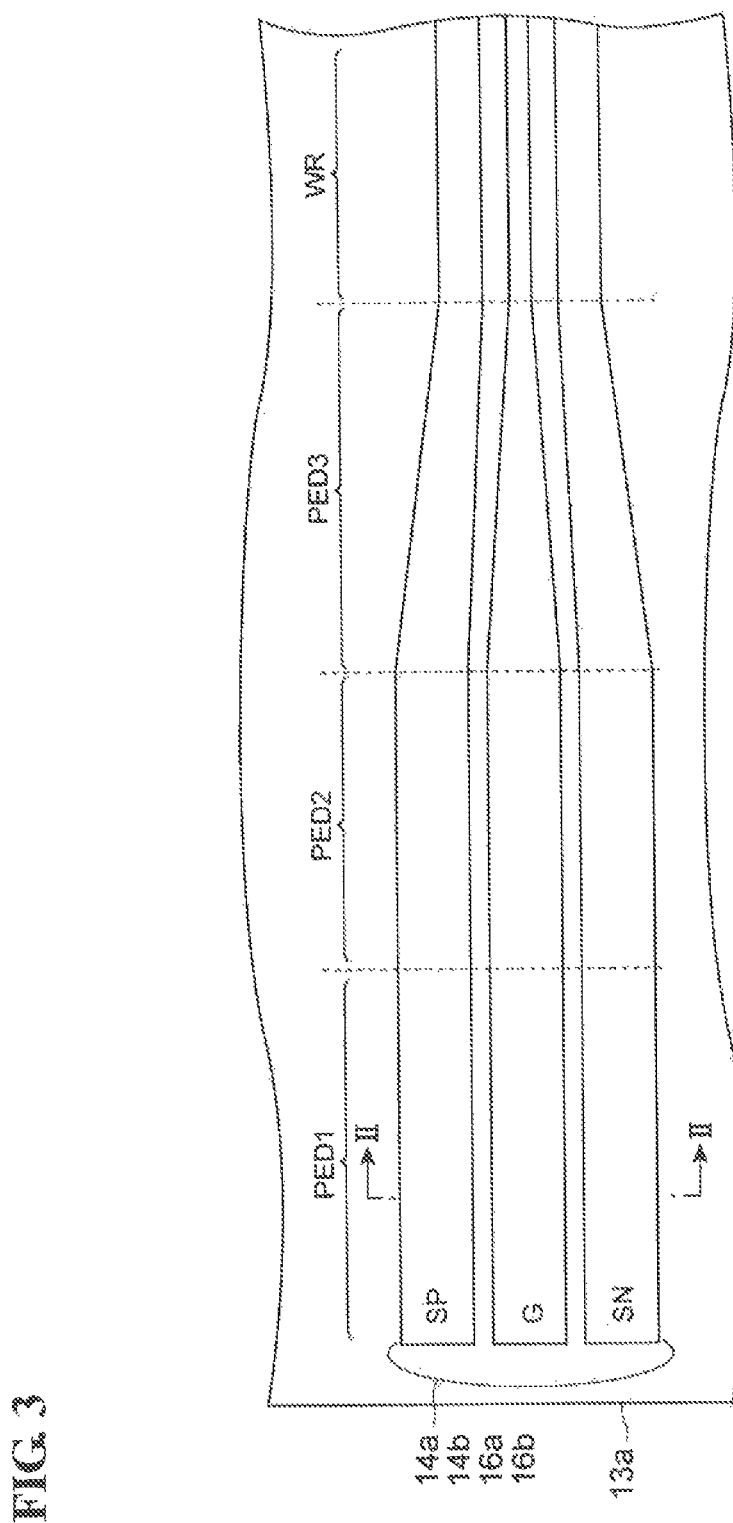

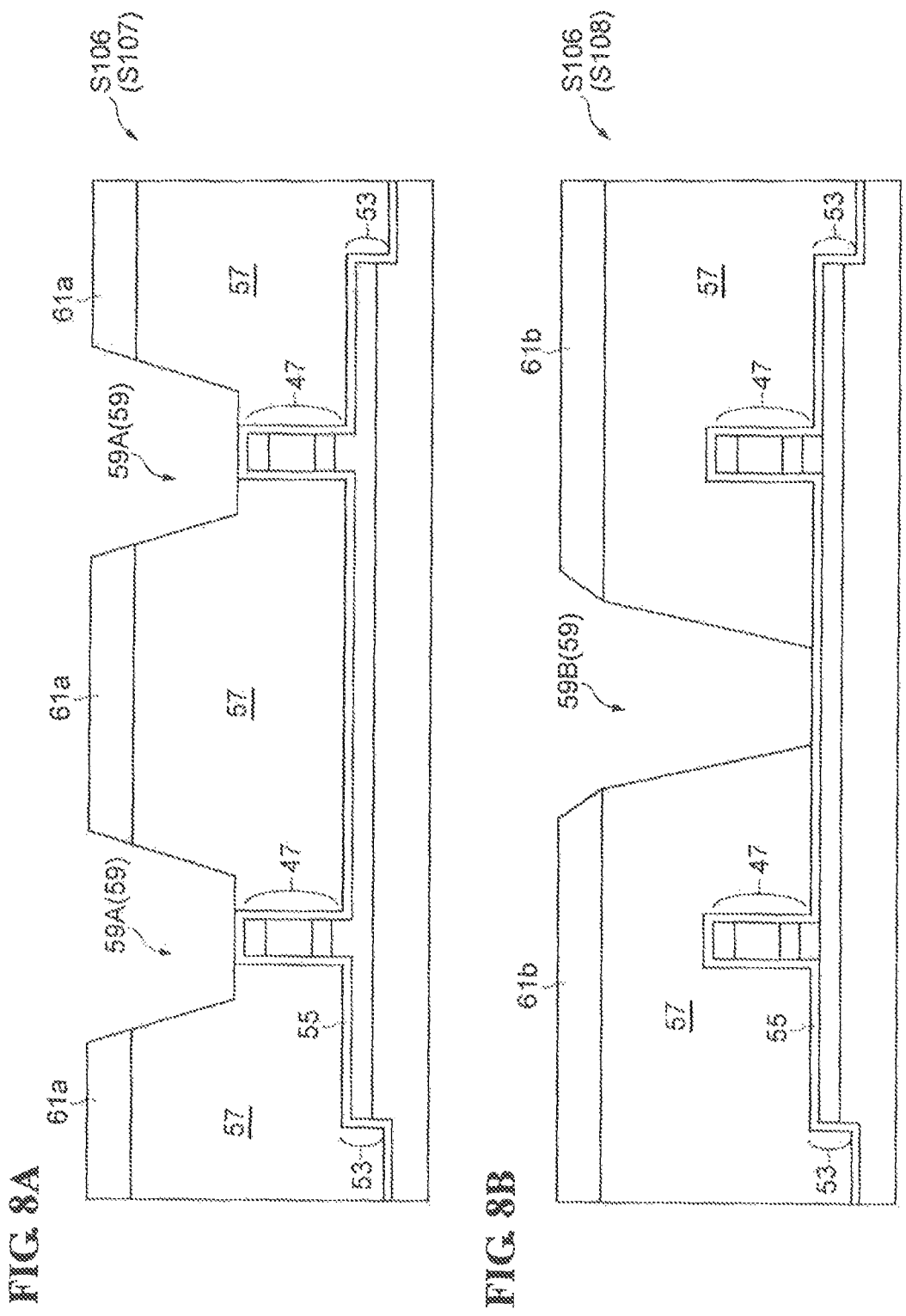

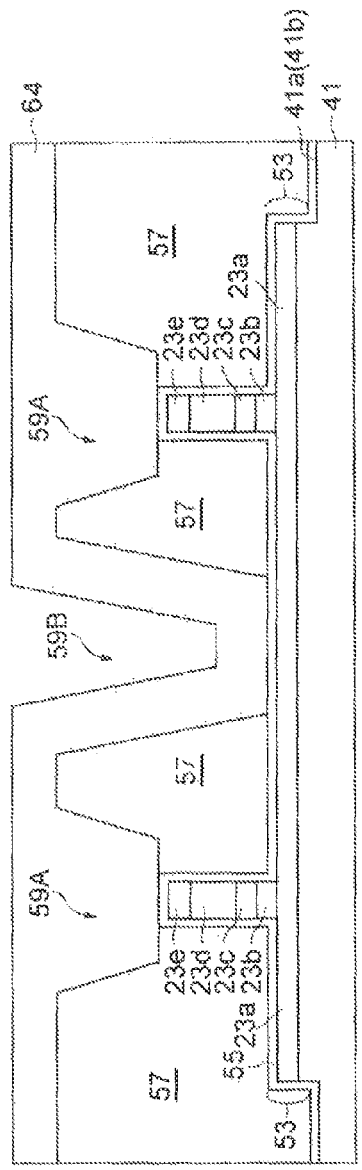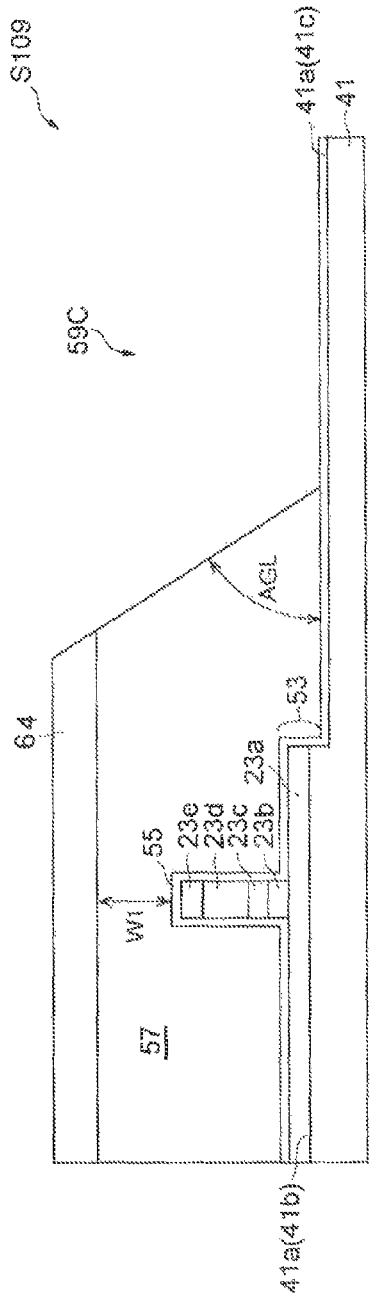

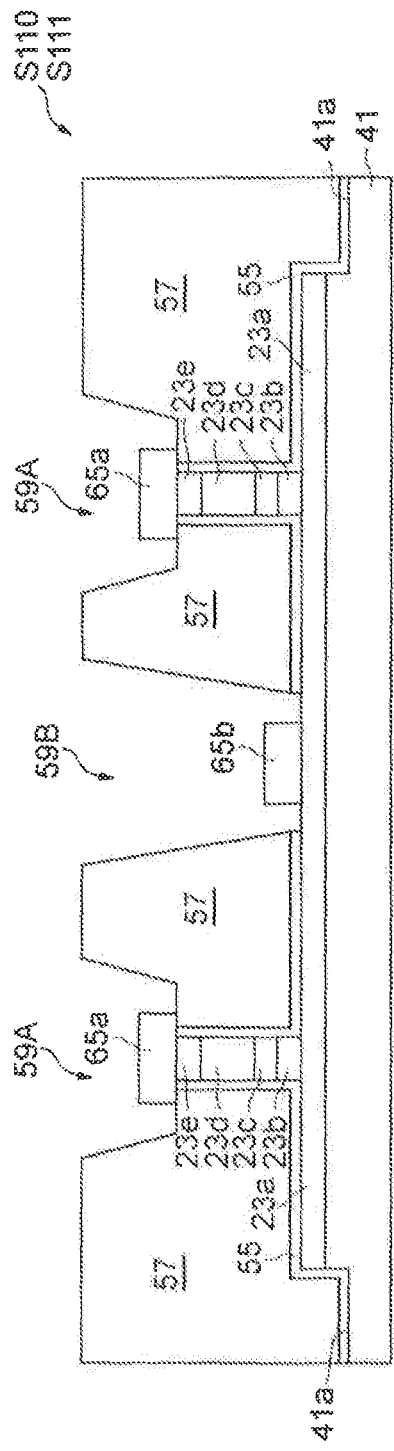
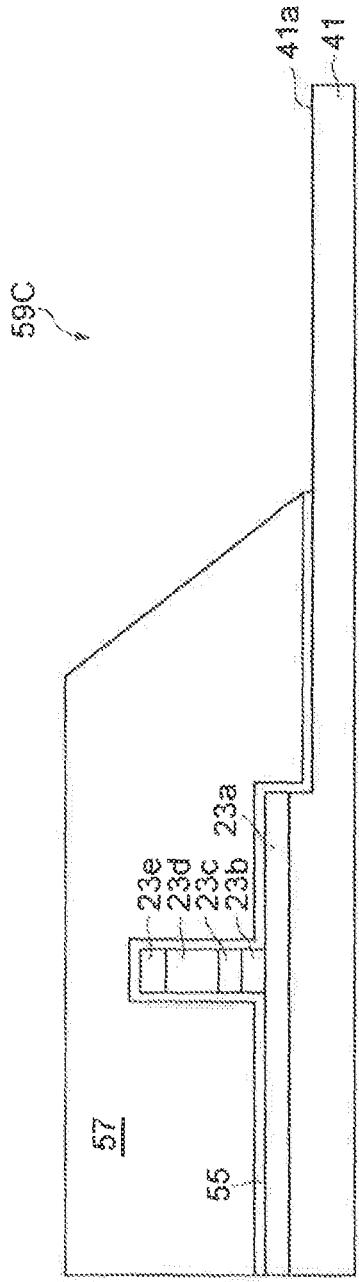

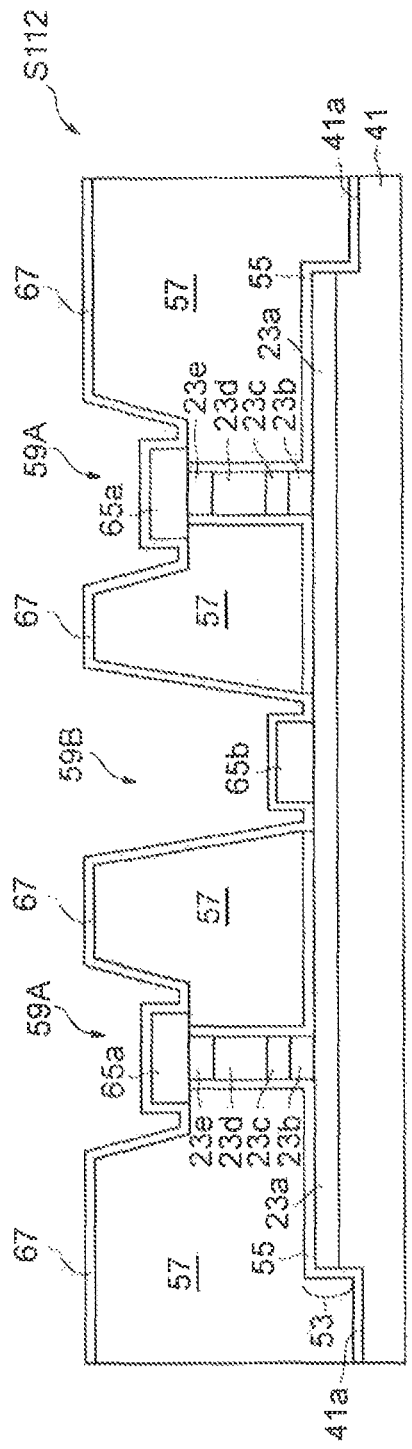
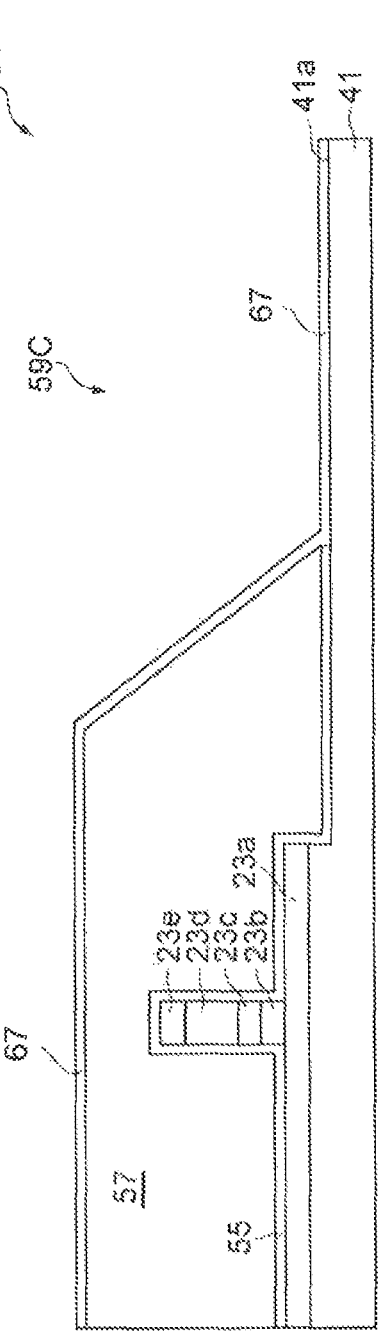
FIG. 11A
FIG. 11B

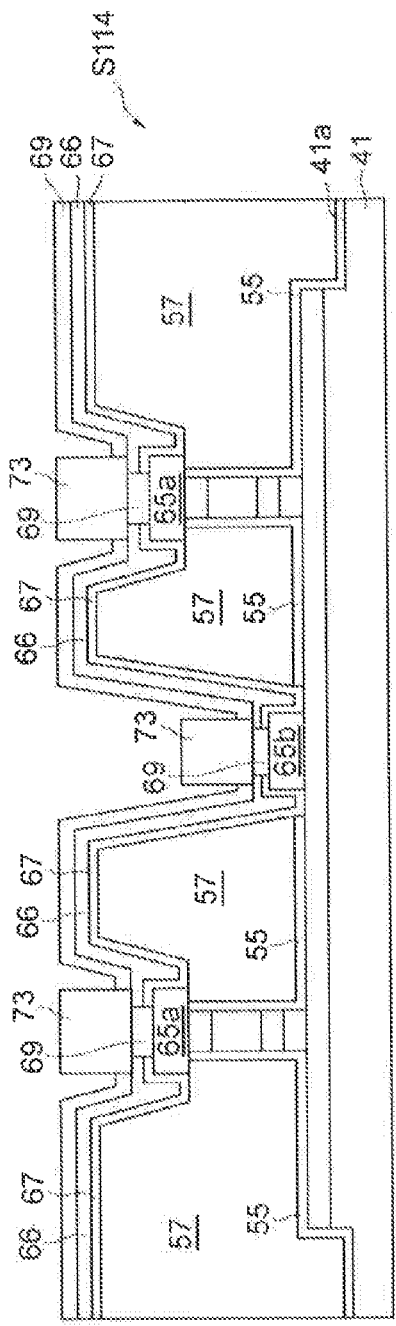
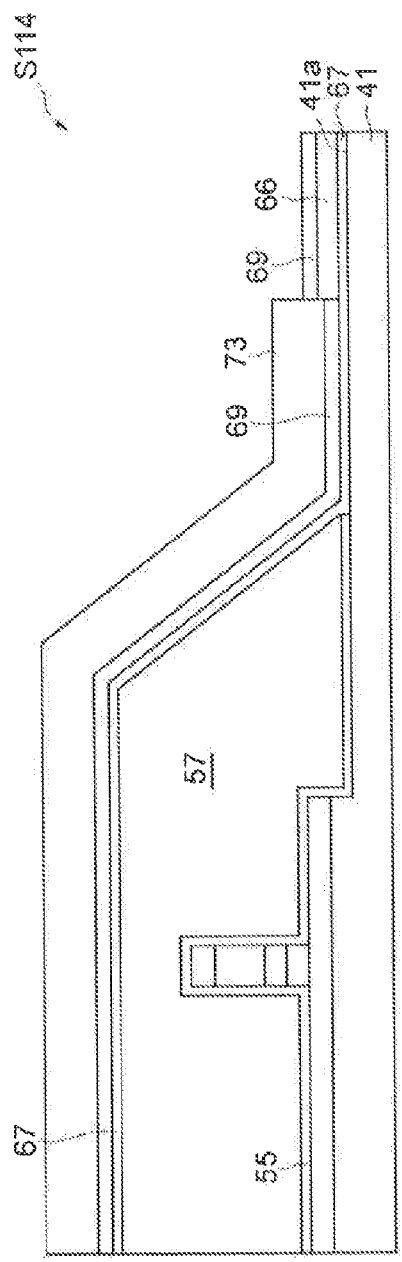
FIG. 13A
FIG. 13B

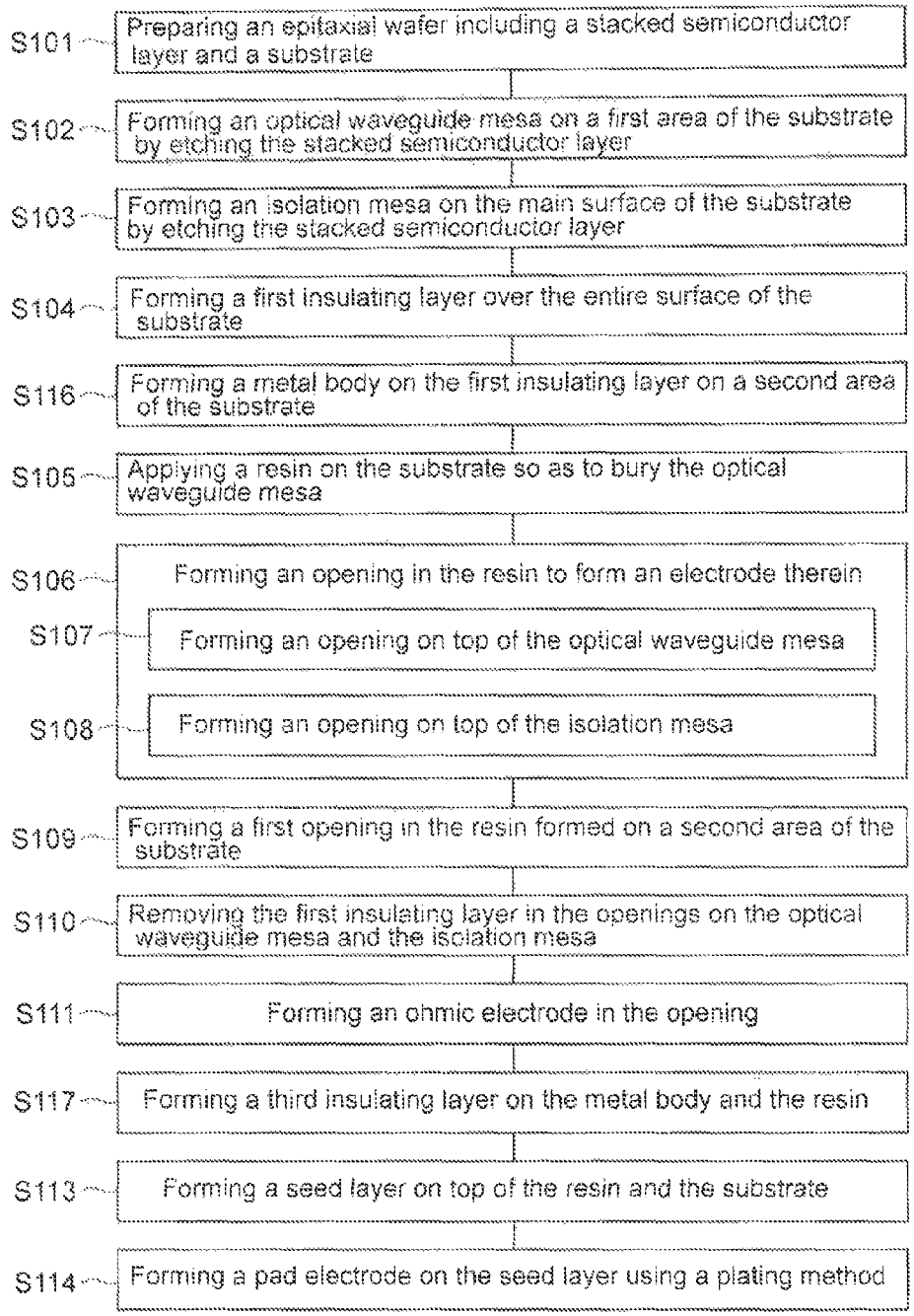

FIG. 15

- S101 — Preparing an epitaxial wafer including a stacked semiconductor layer and a substrate
- S102 — Forming an optical waveguide mesa on a first area of the substrate by etching the stacked semiconductor layer
- S103 — Forming an isolation mesa on the main surface of the substrate by etching the stacked semiconductor layer
- S104 — Forming a first insulating layer over the entire surface of the substrate
- S116 — Forming a metal body on the first insulating layer on a second area of the substrate
- S105 — Applying a resin on the substrate so as to bury the optical waveguide mesa
- S106 — Forming an opening in the resin to form an electrode therein
  - S107 — Forming an opening on top of the optical waveguide mesa
  - S108 — Forming an opening on top of the isolation mesa
- S109 — Forming a first opening in the resin formed on a second area of the substrate
- S110 — Removing the first insulating layer in the openings on the optical waveguide mesa and the isolation mesa
- S111 — Forming an ohmic electrode in the opening
- S117 — Forming a third insulating layer on the metal body and the resin
- S113 — Forming a seed layer on top of the resin and the substrate
- S114 — Forming a pad electrode on the seed layer using a plating method

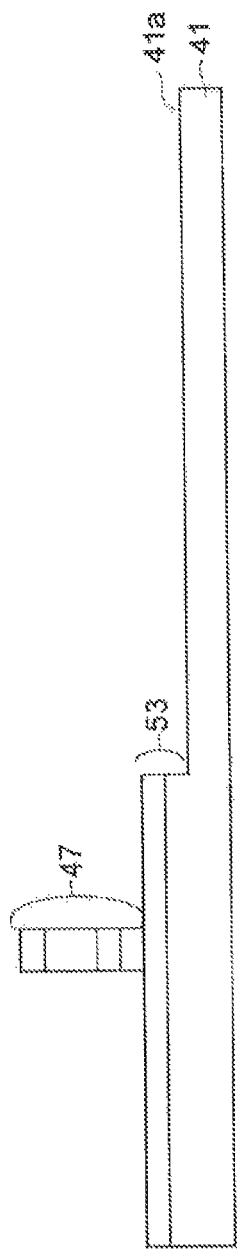
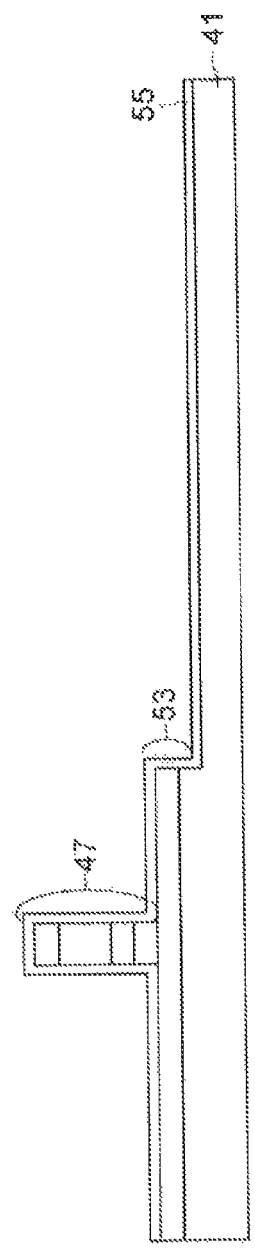

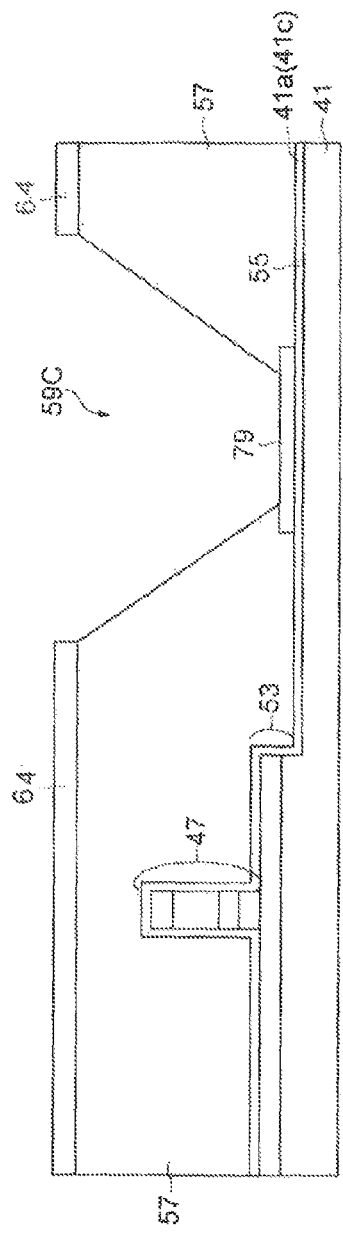

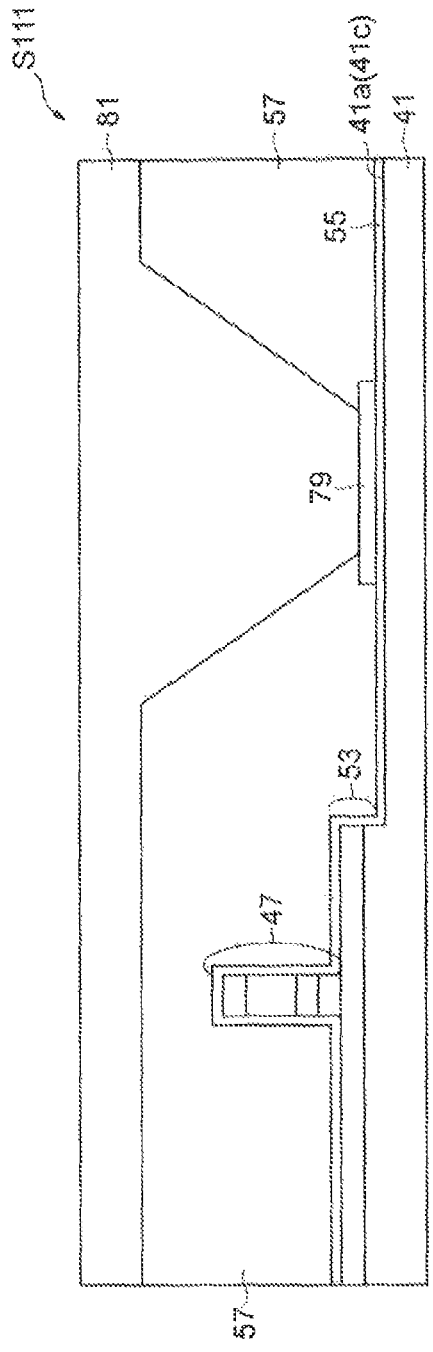
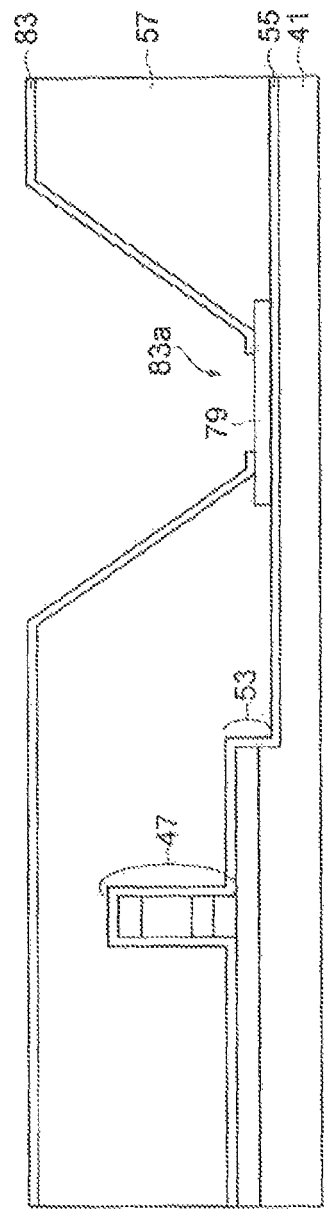
FIG. 20A
FIG. 20B

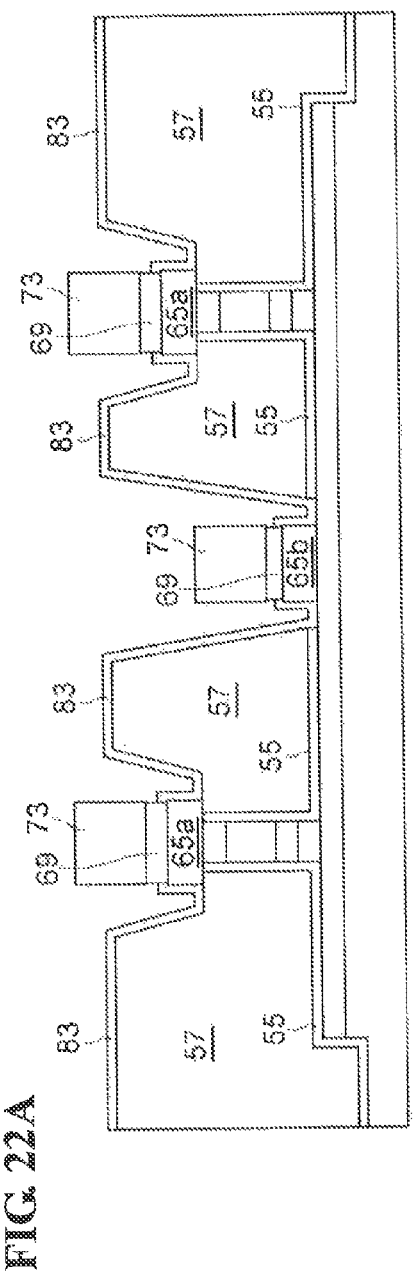
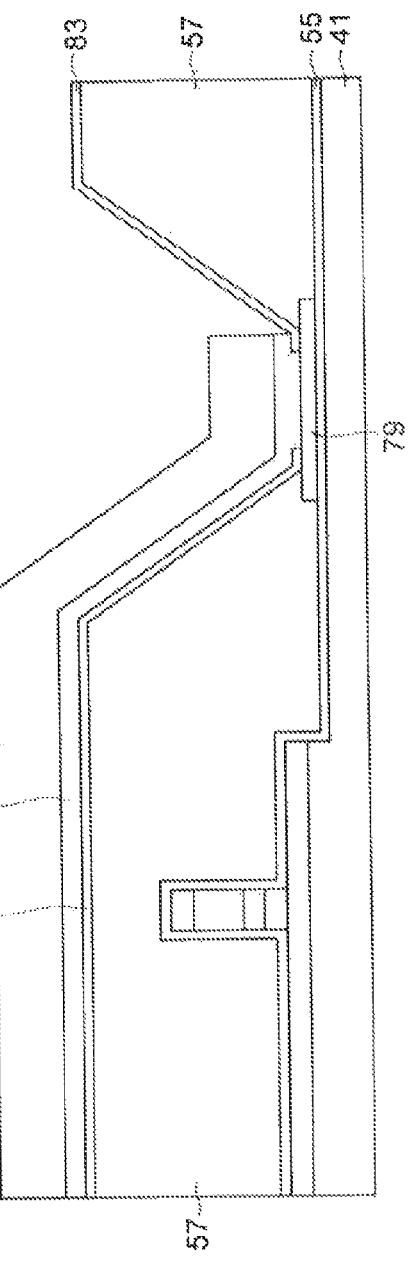

METHOD FOR MANUFACTURING SEMICONDUCTOR MODULATOR AND SEMICONDUCTOR MODULATOR

BACKGROUND OF THE INVENTION

1. Field of the Invention

The present invention relates to a method for manufacturing a semiconductor modulator and a semiconductor modulator.

2. Description of the Related Art

Japanese Unexamined Patent Application Publication No. 2008-205025 discloses a ridge waveguide laser. Both sides of each ridge of the ridge waveguide laser are buried within a benzocyclobutene (BCB) resin.

"40 Gbit/s n-i-n InP Mach-Zehnder modulator with a π voltage of 2.2 V," K. Tsuzuki, T. Ishibashi, T. Ito, S. Oku, Y. Shibata, R. Iga, Y. Kondo and Y. Tohmori, ELECTRONICS LETTERS, 2 Oct. 2003, Vol. 39, No. 20 discloses an InP Mach-Zehnder type optical modulator. In the manufacture of an InP Mach-Zehnder type optical modulator, a waveguide mesa structure, which constitutes a modulation portion, is formed on a semi-insulating InP substrate. The side surfaces of the waveguide mesa structure are buried within a benzocyclobutene (BCB) resin.

SUMMARY OF THE INVENTION

In semiconductor optical modulators, such as Mach-Zehnder type optical modulators, optical waveguides in the semiconductor optical modulator are buried within a benzocyclobutene (BCB) resin. The semiconductor optical modulator has a pad electrode to which external electric signals are applied. The pad electrode is formed on the benzocyclobutene (BCB) resin. Since such a pad electrode requires a large electrode area, the pad electrode separates easily from the benzocyclobutene (BCB) resin. However, burying an optical waveguide within a benzocyclobutene (BCB) resin is effective for high-speed modulation in Mach-Zehnder type optical modulators. Thus, a pad electrode having large adhesion with a benzocyclobutene (BCB) resin is needed for a semiconductor optical modulator including an optical waveguide buried within a benzocyclobutene (BCB) resin.

A method for manufacturing a semiconductor modulator according to a first aspect of the present invention includes the steps of (a) preparing a substrate having a main surface including a first area and a second area arranged in a direction of a first axis; (b) forming a stacked semiconductor layer on the main surface of the substrate; (c) forming a mask on a surface of the stacked semiconductor layer; (d) forming an optical waveguide mesa by etching the stacked semiconductor layer using the mask, the optical waveguide mesa including a first portion having an optical modulation portion and a second portion; (e) applying a resin on a top surface and a side surface of the optical waveguide mesa and on the substrate; (f) forming a first opening in the resin on the second area of the substrate; (g) forming an underlayer structure on the second area of the substrate in contact with the substrate; and (h) forming a pad electrode on the underlayer structure in contact with the underlayer structure through the first opening of the resin. In addition, the underlayer structure includes an insulating layer made of a dielectric material.

Since the pad electrode is disposed in the first opening in the resin, the pad electrode is disposed on the outside of the resin. The underlayer structure including an insulating layer made of a dielectric material is in contact with the second area of the substrate and is in contact with the pad electrode. This can ensure adhesion of the pad electrode.

In the method for manufacturing a semiconductor modulator according to the present invention, the insulating layer of the underlayer structure may have a thickness of 200 nm or more. This can reduce the likelihood of an increase in leakage current resulting from the underlayer structure. The substrate is preferably made of semi-insulating InP, and the stacked semiconductor layer includes a plurality of semiconductor layers composed of a III-V group compound semiconductor.

The method for manufacturing a semiconductor modulator according to the present invention may further include the steps of forming a second opening in the resin disposed on the first portion of the optical waveguide mesa; forming an electrode in the second opening, the electrode being contact with the optical waveguide mesa through the second opening; and forming a metal wire on the resin, the metal wire connecting the pad electrode to the electrode in the second opening. The first portion of the optical waveguide mesa may include a first cladding layer formed of a first-conductive-type semiconductor, a core layer formed of an undoped semiconductor, and a second cladding layer formed of a second-conductive-type semiconductor. The first portion of the optical waveguide mesa and the metal wire may extend in a direction of the first axis. The second portion of the optical waveguide mesa may extend in a direction of a second axis crossing the first axis. In addition, the resin is preferably disposed between the metal wire and the second portion of the optical waveguide mesa at a portion intersecting between the metal wire and the second portion of the optical waveguide mesa.

The pad electrode is provided such that a modulated electrical signal is applied to the semiconductor modulator through the metal wire. According to the method for manufacturing a semiconductor modulator, the metal wire extends over the second portion of the optical waveguide mesa. The resin is disposed between the metal wire and the second portion of the optical waveguide mesa at the portion intersecting between the metal wire and the second portion of the optical waveguide mesa. Therefore, the capacitive coupling between the second portion of the optical waveguide mesa and the metal wire is reduced.

In the method for manufacturing a semiconductor modulator according to the present invention, preferably, the second portion of the optical waveguide mesa includes the first cladding layer, the core layer, and the second cladding layer. The resin in the portion intersecting between the metal wire and the second portion of the optical waveguide mesa has a thickness of 2 micrometers or more.

The method for manufacturing a semiconductor modulator according to the present invention may further include the steps of forming a first insulating layer on a top surface and a side surface of the optical waveguide mesa and on the substrate before the resin is applied, etching the first insulating layer through the first opening in the step of forming the first opening in the resin, and after etching the first insulating layer, forming a second insulating layer on the resin and the substrate exposed through the first opening in the step of forming the underlayer structure. The second insulating layer is in contact with the substrate in the second area. The underlayer structure includes the second insulating layer in the second area.

According to the method for manufacturing a semiconductor modulator, the second insulating layer formed on the substrate as well as on the resin is in contact with the second area of the substrate. Thus, the second insulating layer adheres firmly to the substrate.

The method for manufacturing a semiconductor modulator according to the present invention may further include the step of forming a seed layer on the second insulating layer formed on the resin and the substrate, the seed layer having a pattern for forming the pad electrode and the metal wire. The seed layer is in contact with the second insulating layer. The pad electrode and the metal wire are formed using a plating method using the seed layer.

In the method for manufacturing a semiconductor modulator according to the present invention, preferably, the step of forming the first opening in the resin on the second area of the substrate includes the steps of forming a resist mask on the resin, the resist mask defining the first opening, performing first etching of the resin using the resist mask, selectively etching the resist mask after the first etching of the resin, and performing second etching of the resin after etching the resist mask.

In the method for manufacturing a semiconductor modulator according to the present invention, preferably, the resin is composed of a benzocyclobutene resin containing silicon. The second insulating layer includes at least one of a silicon oxide film and a silicon nitride film. The first etching of the resin, the etching of the resist mask, and the second etching of the resin are performed through RIE using a gas mixture of $CF_4$ and $O_2$. In addition, the steps of performing the first etching, selectively etching the resist mask, and performing the second etching are successively performed in a RIE apparatus by changing the gas flow ratio of $CF_4$ to $O_2$.

According to the method for manufacturing a semiconductor modulator, the first opening of the resin is formed by dry etching including the first etching and the second etching. The second insulating layer is formed on the side surface(s) and top surface of the resin in the first opening and on the second area of the substrate. In the step of forming the first opening in the resin, the first opening has a taper-shaped side surface. The second insulating layer is formed on the taper-shaped side surface of the first opening, and the seed layer is formed on the second insulating layer. The resin is composed of a BCB resin containing silicon (Si), and the first etching of the resin, the etching of the resist mask, and the second etching of the resin are performed through RIE using a gas mixture of $CF_4$ and $O_2$. Thus, these etching steps are successively performed in a RIE apparatus by changing the gas flow ratio of $CF_4$ to $O_2$. The second insulating layer includes at least one of a silicon oxide film and a silicon nitride film. Thus, the second insulating layer adheres well to the resin and the substrate formed of a III-V group compound semiconductor, such as InP.

In the method for manufacturing a semiconductor modulator according to the present invention, preferably, the step of forming the underlayer structure in the second area of the substrate includes the steps of forming a first insulating layer on the top surface and the side surfaces of the optical waveguide mesa and on the substrate before the resin is applied, and forming a metal body on the first insulating layer in the second area of the substrate before the resin is applied. The pad electrode is exposed through the first opening of the resin, and the metal body supports the pad electrode.

According to the method for manufacturing a semiconductor modulator, the first insulating layer and the metal body are formed before the resin is applied. Thus, a structure including the first insulating layer and the metal body in the second area of the substrate can provide an underlayer structure on which the pad electrode is to be formed.

In the method for manufacturing a semiconductor modulator according to the present invention, the resin is preferably disposed on at least a portion of an edge of the metal body in contact with a surface of the metal body. The edge of the metal body is disposed between the first insulating layer and the resin.

The method for manufacturing a semiconductor modulator according to the present invention may further include the steps of forming a third insulating layer on the metal body and the resin; and forming an opening in the third insulating layer on the metal body by etching the third insulating layer. The top surface of the metal body is in contact with the third insulating layer. The first opening of the resin has a greater size than the opening in the third insulating layer on the metal body. Since the top surface of the metal body is in contact with the third insulating layer, the metal body is fixed onto the first insulating layer in the underlayer structure.

In the method for manufacturing a semiconductor modulator according to the present invention, the resin may be composed of a benzocyclobutene resin, and the third insulating layer may be made of silicon oxide or silicon nitride. The benzocyclobutene (BCB) resin adheres well to a silicon oxide film and a silicon nitride film. A silicon oxide film and a silicon nitride film also adhere well to the substrate, for example, formed of InP.

A semiconductor modulator according to a second aspect of the present invention includes (a) a substrate having a main surface including a first area and a second area; (b) an optical waveguide mesa including an optical modulation portion disposed on the first area of the substrate; (c) an electrode disposed on the optical waveguide mesa; (d) a resin disposed on the top surface and the side surfaces of the optical waveguide mesa and on the substrate in the first area of the substrate; (e) a first insulating layer including a first portion and a second portion, the first portion covering the top surface and the side surfaces of the optical waveguide mesa on the first area of the substrate, the second portion being in contact with the second area of the substrate; (f) a pad electrode disposed on the second area of the substrate; and (g) a metal wire connecting the electrode to the pad electrode. The pad electrode is disposed on an underlayer structure. In addition, the underlayer structure includes the second portion of the first insulating layer and a metal body disposed on the second portion of the first insulating layer in contact with the first insulating layer.

The semiconductor modulator according to the present invention may further include a second insulating layer disposed on the resin and on the underlayer structure, the second insulating layer having an opening on the underlayer structure aligned with the pad electrode. The resin is disposed on at least a portion of an edge of the metal body. The top surface of the metal body is in contact with the resin and the second insulating layer.

A semiconductor modulator according to a third aspect of the present invention includes (a) a substrate having a main surface including a first area and a second area; (b) an optical waveguide mesa including an optical modulation portion disposed on the first area of the substrate; (c) an electrode disposed on the optical waveguide mesa; (d) a first insulating layer disposed on the top surface and the side surfaces of the optical waveguide mesa and on the substrate in the first area; (e) a resin disposed on the first insulating layer disposed on the top surface and the side surfaces of the optical waveguide mesa and on the substrate in the first area; (f) a second insulating layer including a first portion and a second portion, the first portion being disposed on the resin in the first area of the substrate, the second portion being disposed on the second area of the substrate in contact with the substrate; (g) a pad electrode disposed on the second area of the substrate; and (h) a metal wire connecting the electrode to the pad electrode. The pad electrode is disposed on an underlayer structure. The underlayer structure includes the second portion of the second insulating layer. In addition, the underlayer structure is in contact with the second area of the substrate.

BRIEF DESCRIPTION OF THE DRAWINGS

FIG. 3 is a schematic view of a structure in the vicinity of a pad electrode.

FIGS. 8A and 8B are schematic views of principal steps in a method for manufacturing a semiconductor modulator according to an embodiment of the present invention.

FIGS. 9A and 9B are schematic views of principal steps in a method for manufacturing a semiconductor modulator according to an embodiment of the present invention.

FIGS. 10A and 10B are schematic views of principal steps in a method for manufacturing a semiconductor modulator according to an embodiment of the present invention.

FIGS. 11A and 11B are schematic views of principal steps in a method for manufacturing a semiconductor modulator according to an embodiment of the present invention.

FIGS. 13A and 13B are schematic views of principal steps in a method for manufacturing a semiconductor modulator according to an embodiment of the present invention.

FIG. 15 is a flow chart of principal steps in a method for manufacturing a semiconductor modulator according to another embodiment of the present invention.

FIGS. 16A and 16B are schematic views of principal steps in a method for manufacturing a semiconductor modulator according to another embodiment of the present invention.

FIGS. 19A and 19B are schematic views of principal steps in a method for manufacturing a semiconductor modulator according to another embodiment of the present invention.

FIGS. 20A and 20B are schematic views of principal steps in a method for manufacturing a semiconductor modulator according to another embodiment of the present invention.

FIGS. 22A and 22B are schematic views of principal steps in a method for manufacturing a semiconductor modulator according to another embodiment of the present invention.

DESCRIPTION OF THE PREFERRED EMBODIMENTS

Figures 1A, 1B:
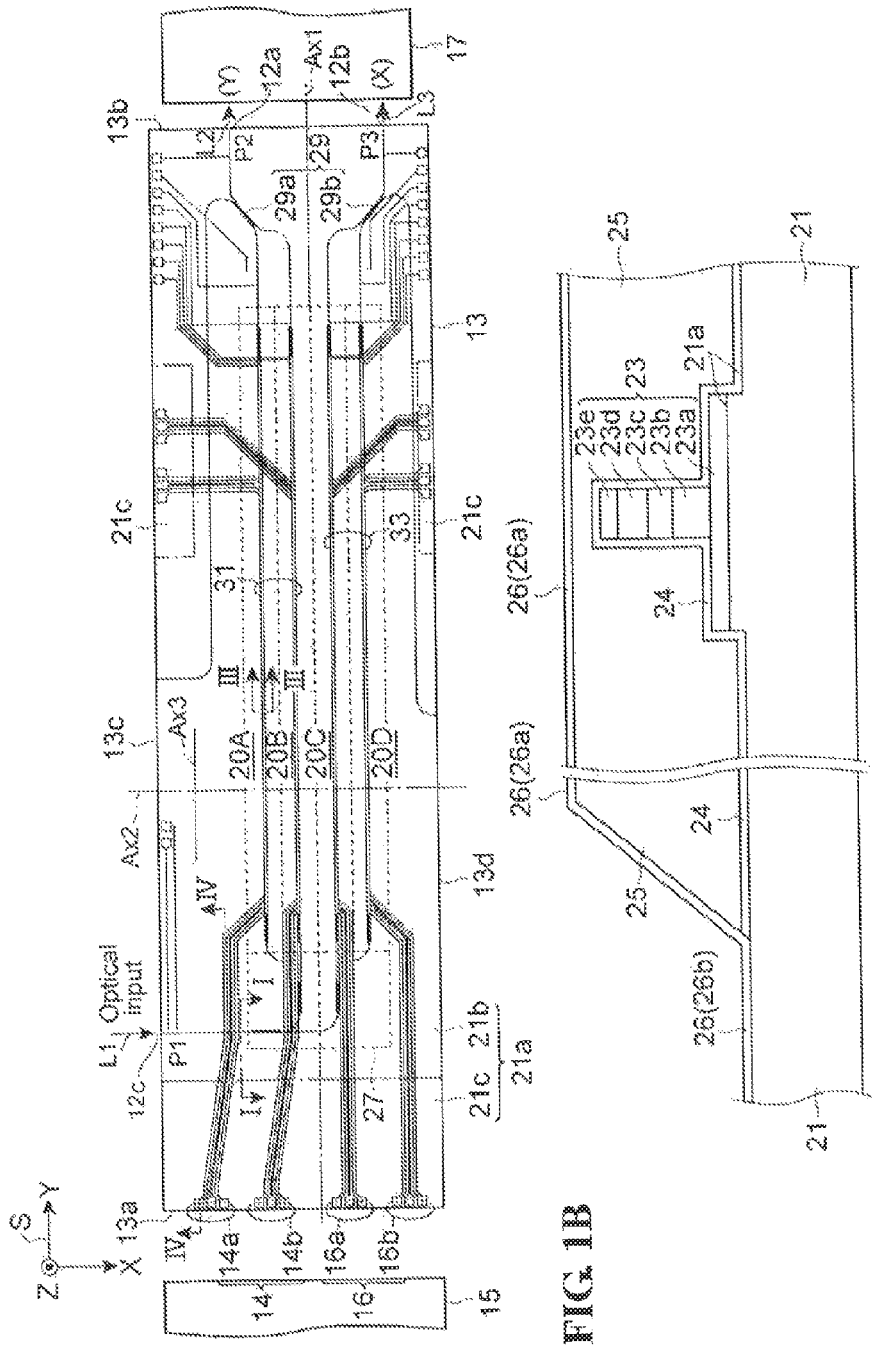
FIGS. 1A and 1B are schematic views of a semiconductor modulator according to an embodiment of the present invention.

A method for manufacturing a semiconductor modulator and a semiconductor modulator according to an embodiment of the present invention will be described below with reference to the accompanying drawings. Like reference numerals designate like parts throughout these figures.

FIGS. 1A and 1B are schematic views of a semiconductor modulator according to an embodiment of the present invention. A semiconductor modulator 13 is used for a polarization multiplexing optical modulator. For example, a multiplexing optical modulator includes the semiconductor modulator 13, a polarized light multiplexing apparatus 17 optically-coupled to an optical output of the semiconductor modulator 13, and a drive circuit 15 for applying a drive signal to the semiconductor modulator 13. In one embodiment, the drive circuit 15, the semiconductor modulator 13, and the polarized light multiplexing apparatus 17 are arranged in this order along a first axis Ax1. The polarized light multiplexing apparatus 17 includes a first mirror, a polarization rotator, and a polarized light multiplexer. FIG. 1A includes a rectangular coordinate system S. In one embodiment, an axis Ax2 extends along the X-axis. The axis Ax1 extends along the Y-axis. For example, the Z-axis extends in the direction normal to the surface of the semiconductor modulator 13.

Referring to FIG. 1A, the semiconductor modulator 13 includes a first optical output port 12a, a second optical output port 12b, and an optical input port 12c. In the polarized light multiplexing apparatus 17, the polarization rotator receives light L2 from the first optical output port 12a of the semiconductor modulator 13. The first mirror receives light L3 from the second optical output port 12b of the semiconductor modulator 13. The polarized light multiplexer is optically-coupled to the second optical output port 12b of the semiconductor modulator 13 via the first mirror. In addition, the polarized light multiplexer is optically-coupled to the first optical output port 12a of the semiconductor modulator 13 via the polarization rotator.

The semiconductor modulator 13 has a first edge 13a and a second edge 13b. The first edge 13a and the second edge 13b cross the first axis Ax1. The first edge 13a and the second edge 13b extend along the second axis Ax2, which crosses the first axis Ax1. The drive circuit 15, the first edge 13a of the semiconductor modulator 13, and the second edge 13b of the semiconductor modulator 13 are arranged in this order along the first axis Ax1.

The first optical output port 12a and the second optical output port 12b of the semiconductor modulator 13 are disposed on the second edge 13b of the semiconductor modulator 13. The semiconductor modulator 13 includes an optical demultiplexer 27, a first optical multiplexer 29a (29), a second optical multiplexer 29b (29), a first group of optical modulators 31, and a second group of optical modulators 33. The optical demultiplexer 27, the first optical multiplexer 29a, the second optical multiplexer 29b, the first group of optical modulators 31, and the second group of optical modulators 33 constitute an optical element. The first group of optical modulators 31 is coupled to the first optical output port 12a via the first optical multiplexer 29a. The second group of optical modulators 33 is optically-coupled to the second optical output port 12b via the second optical multiplexer 29b. The first group of optical modulators 31 and the second group of optical modulators 33 are optically-coupled to the optical input port 12c via the optical demultiplexer 27.

The first group of optical modulators 31 includes a first optical modulator 20A and a second optical modulator 20B. The second group of optical modulators 33 includes a third optical modulator 20C and a fourth optical modulator 20D. The first optical modulator 20A, the second optical modulator 20B, the third optical modulator 20C, and the fourth optical modulator 20D are optically-coupled to the optical input port 12c via the optical demultiplexer 27.

The semiconductor modulator 13 includes a first input 14a, a second input 14b, a third input 16a, and a fourth input 16b along the first edge 13a of the semiconductor modulator 13. The semiconductor modulator 13 includes a first group of inputs 14 and a second group of inputs 16. The first group of inputs 14 includes the first input 14a and the second input 14b. The second group of inputs 16 includes the third input 16a and the fourth input 16b. The drive circuit 15 is electrically connected to the first input 14a, the second input 14b, the third input 16a, and the fourth input 16b of the semiconductor modulator 13.

The semiconductor modulator 13 includes first group wiring (electric wiring) and second group wiring (electric wiring). The first group wiring connects the first group of inputs 14 to the first group of optical modulators 31. The second group wiring connects the second group of inputs 16 to the second group of optical modulators 33. The first group wiring extends over an optical waveguide extending from the input port 12c. One portion of the second group wiring connected to one of the optical modulators 33 extends over the optical waveguide extending from the input port 12c. The other portion of the second group wiring connected to the other of the optical modulators 33 does not extend over the optical waveguide extending from the input port 12c.

The semiconductor modulator 13 receives input light L1 through the input port 12c. The first group of optical modulators 31 outputs output light L2 to the first optical output port 12a. The first group of optical modulators 31 receives drive signals through a first group wiring conductor. The second group of optical modulators 33 outputs output light L3 to the second optical output port 12b. The second group of optical modulators 33 receives drive signals through a second group wiring conductor.

The first edge 13a of the semiconductor modulator 13 is arranged in an opposite side to the second edge 13b. The first optical output port 12a and the second optical output port 12b are disposed on the second edge 13b of the semiconductor modulator 13. The first input 14a, the second input 14b, the third input 16a, and the fourth input 16b are disposed along the first edge 13a of the semiconductor modulator 13. In this structure, electric signals are input to the first edge 13a opposite to the second edge 13b from which optical signals are output. Electric signals received through the first edge 13a of the semiconductor modulator 13 are converted into optical signals by the modulators 20A, 20B, 20C, and 20D, and the optical signals are output through the second edge 13b on the opposite side to the first edge 13a of the semiconductor modulator 13. Since signals (electric signals and optical signals) propagate along the first axis Ax1, input wiring for conducting the electric signals and optical waveguides of the modulators 20A, 20B, 20C, and 20D for guiding optical signals are also arranged along the first axis Ax1.

The semiconductor modulator 13 has a third edge 13c and a fourth edge 13d. The third edge 13c and the fourth edge 13d extend along a third axis Ax3, which crosses the second axis Ax2. The optical input port 12c is disposed on the third edge 13c. The first to fourth modulators 20A to 20D are arranged along the second axis Ax2.

Referring to FIG. 1B, the semiconductor modulator 13 includes a substrate 21 and a stacked semiconductor layer 23. The substrate 21 is made of a III-V group compound semiconductor. The stacked semiconductor layer 23 including semiconductor layers constituting an optical waveguide is disposed on a main surface 21a of the substrate 21. The stacked semiconductor layer 23 includes a first contact layer 23a of a first conductivity type, a first cladding layer 23b of a first conductivity type, a core layer 23c, a second cladding layer 23d of a second conductivity type, and a second contact layer 23e of a second conductivity type in this order on the main surface 21a of the substrate 21. The core layer 23c is made of an undoped semiconductor. The stacked semiconductor layer 23 includes an optical waveguide having a mesa structure. The top surface and side surfaces of the optical waveguide mesa and the main surface 21a of the substrate 21 are covered with an insulating layer 24. The stacked semiconductor layer 23 of the optical waveguide mesa and the insulating layer 24 are buried within the resin 25. The resin 25 is covered with an insulating layer 26.

One embodiment of the substrate 21 and the stacked semiconductor layer 23.

Substrate 21: semi-insulating InP
n+-type first contact layer 23a: InP doped with Si
n-type first cladding layer 23b: InP doped with Si
i-type core layer 23c: undoped GaInAsP
p-type second cladding layer 23d: InP doped with Zn
$p^+$-type second contact layer 23e: InP doped with Zn
Resin 25: benzocyclobutene (BCB) resin
Insulating layer 24: silicon oxide film
Insulating layer 26: silicon oxide film Referring back to FIG. 1A, the main surface 21a of the substrate 21 includes a first area 21b and a second area 21c. An optical waveguide mesa including an optical modulation portion of the semiconductor modulator 13 is disposed on the first area 21b. A pad electrode structure to be connected to the inputs 14 and 16 is disposed on the second area 21c. In the embodiment, the first area 21b and the second area 21c are arranged in a direction of the first axis Ax1. The optical waveguide mesa including the optical modulation portion of the semiconductor modulator 13 has a layered structure of the stacked semiconductor layer 23. The resin 25 has at least one opening, in which a pad electrode is to be formed, on the second area 21c.

Figure 2:
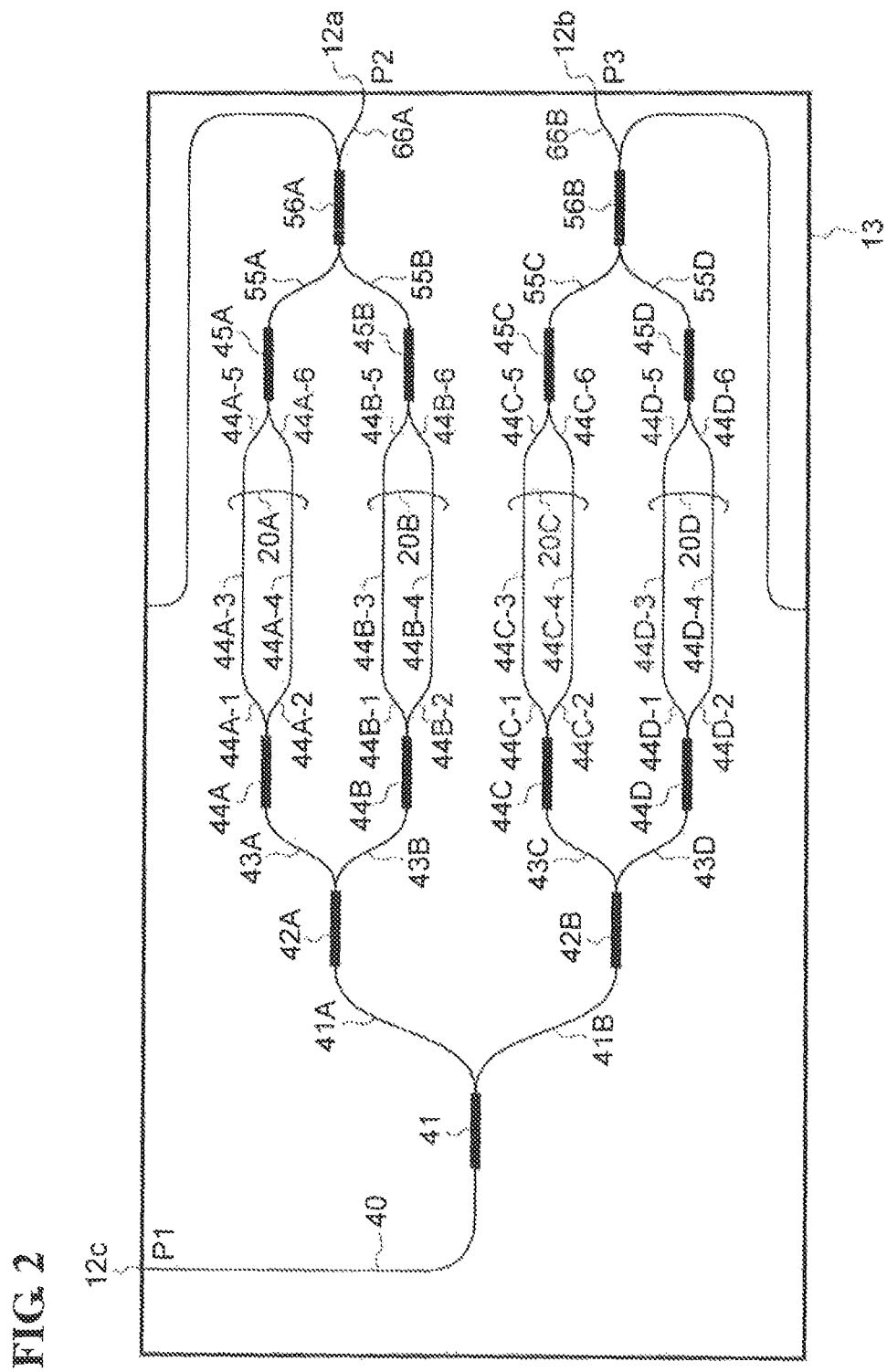
FIG. 2 is a schematic view of the arrangement of optical waveguides in the semiconductor modulator.

FIG. 2 is a schematic view of the arrangement of optical waveguides in the semiconductor modulator. The arrangement of optical waveguides in the semiconductor modulator 13 will be described below with reference to FIG. 2.

For example, the four optical modulators 20A, 20B, 20C, and 20D are arranged in parallel on a support formed of a semi-insulating InP substrate. The semiconductor modulator 13 includes the two optical output ports 12a and 12b and the optical input port 12c. The optical input port 12c is connected to one end of an optical input waveguide 40. In the present embodiment, the optical modulators 20A, 20B, 20C, and 20D include a Mach-Zehnder type optical modulator.

The other end of the optical input waveguide 40 is connected to an input end of a 1×2 multimode interference (MMI) coupler 41. Two output ends of the 1×2 MMI coupler 41 are connected to input ends of 1×2 MMI couplers 42A and 42B via curved waveguides 41A and 41B, respectively. Two output ends of the 1×2 MMI coupler 42A are connected to input ends of two 1×2 MMI couplers 44A and 44B via curved waveguides 43A and 43B, respectively. Two output ends of the 1×2 MMI coupler 42B are connected to input ends of two 1×2 MMI couplers 44C and 44D via curved waveguides 43C and 43D, respectively.

Two output ends of the 1×2 MMI coupler 44A are connected to modulation waveguides 44A-3 and 44A-4 via curved waveguides 44A-1 and 44A-2, respectively. Two output ends of the 1×2 MMI coupler 44B are connected to modulation waveguide 44B-3 and 44B-4 via curved waveguides 44B-1 and 44B-2, respectively. Two output ends of the 1×2 MMI coupler 44C are connected to modulation waveguide 44C-3 and 44C-4 via curved waveguides 44C-1 and 44C-2, respectively. Two output ends of the 1×2 MMI coupler 44D are connected to modulation waveguide 44D-3 and 44D-4 via curved waveguides 44D-1 and 44D-2, respectively.

The modulation waveguides 44A-3 and 44A-4 are connected to two input ends of the 1×2 MMI coupler 45A via curved waveguides 44A-5 and 44A-6, respectively. The modulation waveguides 44B-3 and 44B-4 are connected to two input ends of the 1×2 MMI coupler 45B via curved waveguides 44B-5 and 44B-6, respectively. The modulation waveguides 44C-3 and 44C-4 are connected to two input ends of the 1×2 MMI coupler 45C via curved waveguides 44C-5 and 44C-6, respectively. The modulation waveguides 44D-3 and 44D-4 are connected to two input ends of the 1×2 MMI coupler 45D via curved waveguides 44D-5 and 44D-6, respectively.

One output end of each of the 1×2 MMI couplers 45A and 45B is connected to an input end of a 2×2 MMI coupler 56A via curved waveguides 55A and 55B, respectively. One output end of each of the 1×2 MMI couplers 45C and 45D is connected to an input end of a 2×2 MMI coupler 56B via curved waveguides 55C and 55D, respectively. One output end of the 2×2 MMI coupler 56A is connected to the optical output port 12a. One output end of the 2×2 MMI coupler 56B is connected to the optical output port 12b.

Each of the first modulator 20A, the second modulator 20B, the third modulator 20C, and the fourth modulator 20D includes a Mach-Zehnder type optical modulator, as illustrated in FIG. 2. The first modulator 20A includes the 1×2 MMI coupler 44A, the modulation waveguide (first arm waveguide) 44A-3, the modulation waveguide (second arm waveguide) 44A-4, and the 1×2 MMI coupler 45A. The second modulator 20B includes the 1×2 MMI coupler 44B, the modulation waveguide (first arm waveguide) 44B-3, the modulation waveguide (second arm waveguide) 44B-4, and the 1×2 MMI coupler 45B. The third modulator 20C includes the 1×2 MMI coupler 44C, the modulation waveguide (first arm waveguide) 44C-3, the modulation waveguide (second arm waveguide) 44C-4, and the 1×2 MMI coupler 45C. The fourth modulator 20D includes the 1×2 MMI coupler 44D, the modulation waveguide (first arm waveguide) 44D-3, the modulation waveguide (second arm waveguide) 44D-4, and the 1×2 MMI coupler 45D. In the semiconductor modulator 13, the Mach-Zehnder type optical modulator includes two arm waveguides and a modulating electrode for applying drive signals to the arm waveguides.

FIG. 3 is a schematic view of a structure in the vicinity of a pad electrode. FIG. 3 is a plan view of one of the first input 14a, the second input 14b, the third input 16a and the fourth input 16b. Each of these inputs 14a, 14b, 16a, and 16b includes an electrode. The electrode includes three pad electrodes SP, G, and SN. The pad electrode SP receives one of differential signals of a modulated signal. The pad electrode SN receives the other differential signals of the modulated signal. The pad electrode G is a ground wire. Each of the pad electrodes SP, G, and SN includes a first portion PED1, a second portion PED2, and a third portion PED3. The first portion PED1, the second portion PED2, and the third portion PED3 have a length of 150, 15, and 160 µm, respectively, for example.

The pad electrodes of each of the inputs 14a, 14b, 16a, and 16b are connected to an electrode via a metal wire WR. Through this electrode, an electric signal is applied to an optical waveguide mesa of the Mach-Zehnder type optical modulator.

Figure 4A:
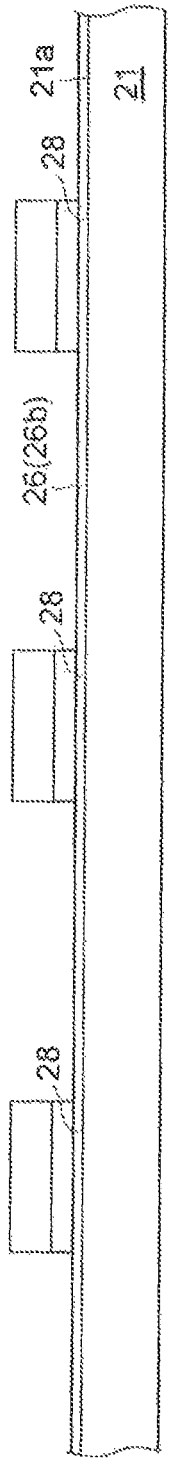
FIGS. 4A and 4B are schematic cross-sectional views of a structure in the vicinity of a pad electrode.
Figure 4B:
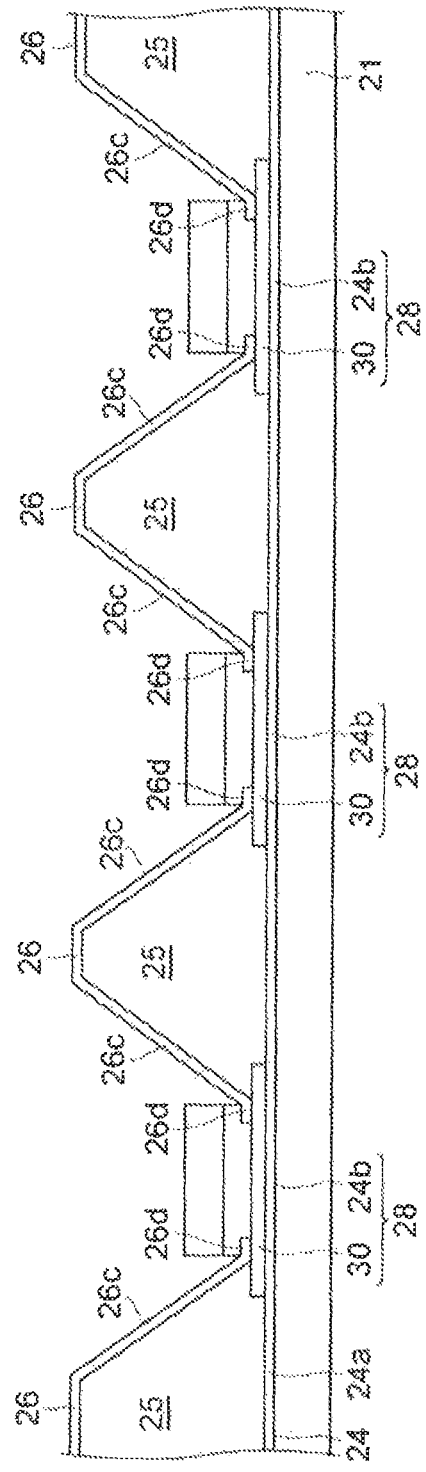

FIGS. 4A and 4B are schematic cross-sectional views of a structure in the vicinity of a pad electrode. FIG. 4A is a cross-sectional view taken along the line II-II in FIG. 3. In a first structure illustrated in FIG. 4A, the insulating layer 26 includes a first portion 26a and a second portion 26b, as illustrated in FIG. 1B. The first portion 26a of the insulating layer 26 is disposed on the resin 25 on the first area 21b of the substrate 21. The second portion 26b of the insulating layer 26 is in contact with the substrate 21 in the second area 21c. The insulating layer 24 covers the optical waveguide mesa on the first area 21b of the substrate 21 and is disposed between the resin 25 and the first area 21b of the substrate 21. The insulating layer 24 is connected to the insulating layer 26 at the edge of the opening in the resin 25.

As illustrated in FIG. 4A, the pad electrodes of each of the inputs 14a, 14b, 16a, and 16b are disposed on an underlayer structure 28. The underlayer structure 28 includes the second portion 26b of the insulating layer 26. The underlayer structure 28 is in contact with the substrate 21 in the second area 21c and supports the pad electrodes. The insulating layer 26 (26b) in the underlayer structure 28 is in contact with the substrate 21 in the second area 21c, extends on the second area 21c, and is connected to the insulating layer 26 (26a) on the resin 25. The portion 26b and the portion 26a of the insulating layer 26 are simultaneously formed.

FIG. 4B is another cross-sectional view taken along the line II-II in FIG. 3. In a second structure illustrated in FIG. 4B, the insulating layer 24 includes a first portion 24a and a second portion 24b. The first portion 24a of the insulating layer 24 is disposed on the first area 21b of the substrate 21. The second portion 24b of the insulating layer 24 is in contact with the substrate 21 in the second area 21c. The insulating layer 24 covers the optical waveguide mesa on the first area 21b of the substrate 21 and is disposed between the resin 25 and the first area 21b of the substrate 21.

In the embodiment illustrated in FIG. 4B, the underlayer structure 28 includes the second portion 24b of the insulating layer 24 and a metal body 30. The metal body 30 is in contact with the second portion 24b of the insulating layer 24. The underlayer structure 28 is in contact with the substrate 21 in the second area 21c and supports the pad electrodes. The insulating layer 24 (24b) in the underlayer structure 28 is in contact with the substrate 21 in the second area 21c, extends on the second area 21c, and is connected to the insulating layer 24 (24a) under the resin 25. The portion 24b and the portion 24a of the insulating layer 24 are simultaneously formed. The insulating layer 24 between the metal body 30 and the substrate 21 improves adhesion between the metal body 30 and the substrate 21. This can prevent the metal body from separating from the substrate.

The resin 25 is disposed on at least a portion of the edge of the metal body 30. Thus, the metal body 30 is firmly pressed down on the substrate 21. The top surface of the metal body 30 is in contact with the resin 25.

The insulating layer 26 has an opening corresponding to each of the pad electrodes of each of the inputs 14a, 14b, 16a, and 16b. The insulating layer 26 is formed of a silicon dioxide ($SiO_2$) film or a silicon nitride (SiN) film. The insulating layer 26 includes a portion 26c on the resin and a portion 26d on the metal body 30. The portion 26c and the portion 26d of the insulating layer 26 are simultaneously formed. The top surface of the metal body 30 is in contact with the insulating layer 26, and the undersurface of the metal body 30 is in contact with the insulating layer 24. The insulating layer 24 improves adhesion between the metal body 30 and the substrate 21. The metal body 30 is pressed down on the substrate 21 via the insulating layer 26.

In the embodiments illustrated in FIGS. 4A and 4B, a first portion of the optical waveguide mesa is connected to a modulating electrode through a second opening of the resin 25. The second opening of the resin 25 is formed on the first portion of the optical waveguide mesa, and the modulating electrode is formed in the second opening in contact with the first portion of the optical waveguide mesa. The first portion of the optical waveguide mesa includes the optical modulation portion of the semiconductor modulator 13. The modulating electrode is connected to a pad electrode via the metal wire WR. The first portion of the optical waveguide mesa and the metal wire WR extend in a direction of the first axis Ax1, as illustrated in FIG. 1A. The first portion of the optical waveguide mesa includes the stacked semiconductor layer 23. Specifically, the first portion of the optical waveguide mesa includes the first contact layer 23a of a first conductive type, the first cladding layer 23b of the first conductive type, the non-doped core layer 23c, the second cladding layer 23d of a second conductive type, and the second contact layer 23e of the second conductive type. The first contact layer 23a, the first cladding layer 23b, the core layer 23c, the second cladding layer 23d, and the second contact layer 23e are made of a III-V group compound semiconductor. The core layer 23c is disposed between the first cladding layer 23b and the second cladding layer 23d.

The metal wire WR, which connects the pad electrode to the modulating electrode, may extend over a second portion of the optical waveguide mesa. The second portion of the optical waveguide mesa extends in a direction of the second axis Ax2 crossing the first axis Ax1, as illustrated in FIG. 1A. In the second portion of the optical waveguide mesa, the resin 25 is disposed between the metal wire WR and the optical waveguide mesa. Thus, the resin 25 prevents the metal wire WR from come into contact with the second portion of the optical waveguide mesa. The metal wire WR is capacitively-coupled to the second portion of the optical waveguide mesa and thereby forms a parasitic capacitor. The second portion of the optical waveguide mesa has the same stacked semiconductor layer structure (stacked semiconductor layer 23) as the first portion of the optical waveguide mesa. More specifically, the second portion of the optical waveguide mesa includes the first contact layer 23a, the first cladding layer 23b, the core layer 23c, the second cladding layer 23d, and the second contact layer 23e. The metal wire WR extends over the second portion of the optical waveguide mesa while crossing the second portion of the optical waveguide mesa. The thickness of the resin in a portion intersecting between the metal wire WR and the second portion of the optical waveguide mesa is 2 micrometers or more.

Figure 5:
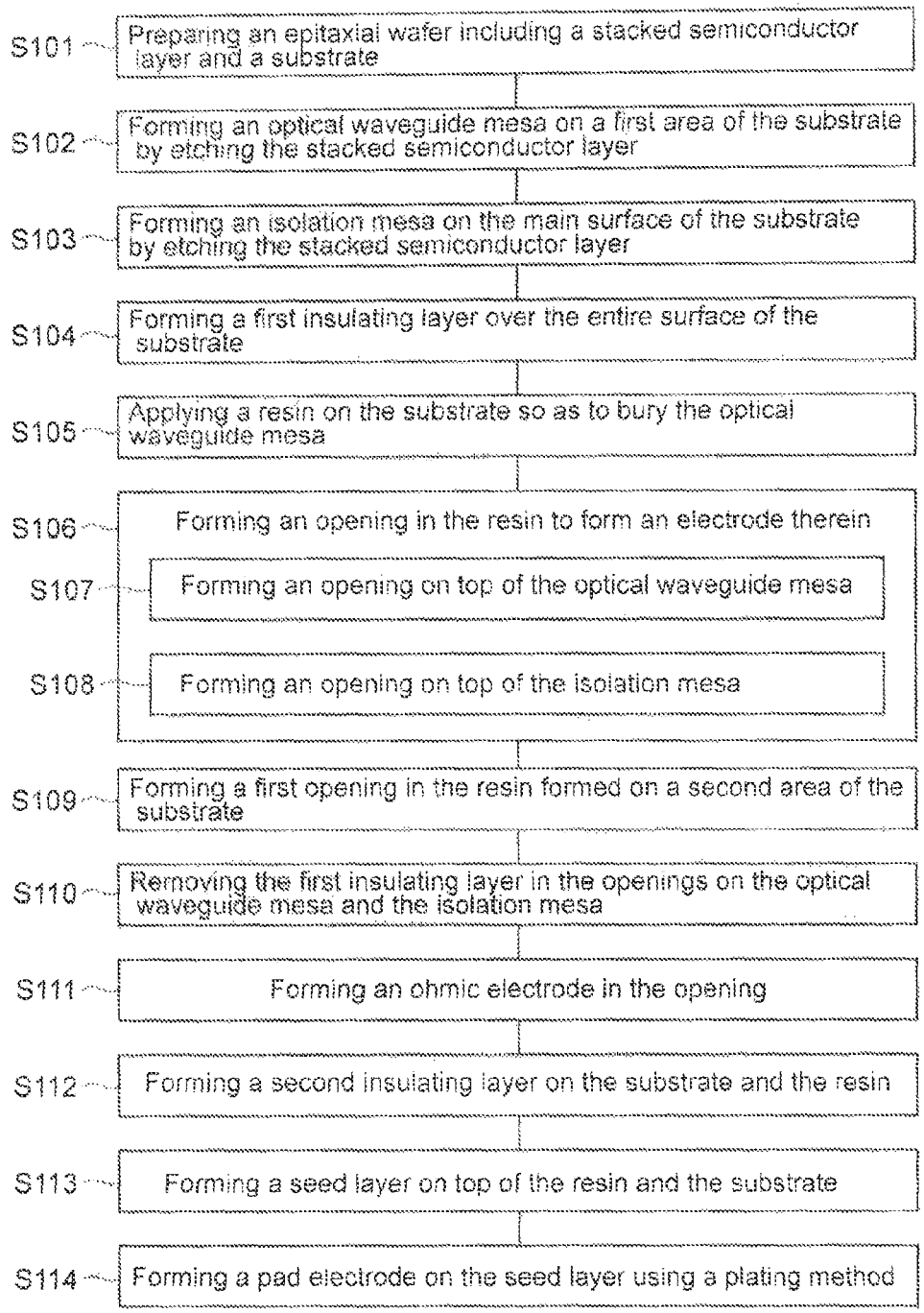
FIG. 5 is a flow chart of principal steps in a method for manufacturing a semiconductor modulator according to an embodiment of the present invention.

FIG. 5 is a flow chart of principal steps in a method for manufacturing a semiconductor modulator according to an embodiment of the present invention.

Figure 6A:
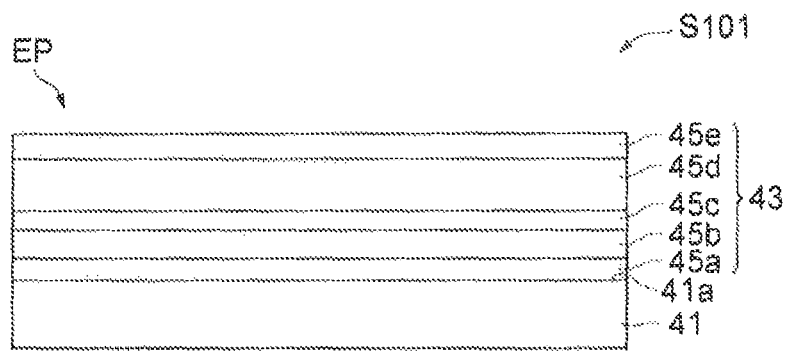
FIGS. 6A to 6C are schematic views of principal steps in a method for manufacturing a semiconductor modulator according to an embodiment of the present invention.

In step S101, an epitaxial wafer EP is prepared. A stacked semiconductor layer 43 including semiconductor layers is grown on a main surface 41a of the semiconductor substrate 41. For example, the stacked semiconductor layer 43 is grown using a metal-organic vapor phase epitaxy (MOVPE) method. In a preferred embodiment, the semiconductor substrate 41 is formed of semi-insulating InP doped with Fe. The stacked semiconductor layer 43 includes at least one III-V group compound semiconductor layer and is disposed on the main surface 41a of the semiconductor substrate 41. In one embodiment, as illustrated in FIG. 6A, a n-InP contact layer 45a, a n-InP cladding layer (buffer layer) 45b, a core layer 45c, a p-InP cladding layer 45d, and a $p^+$-GaInAs contact layer 45e are grown on the semi-insulating InP substrate layer using a crystal growth method, such as a metal-organic vapor phase epitaxy (MOVPE) method. The core layer 45c has a multilayer quantum well structure including a well layer and a barrier layer. The well layer may be formed of an undoped GaInAsP. The barrier layer may be formed of a GaInAsP having a different composition from the GaInAsP of the well layer. As described below, the main surface 41a of the semiconductor substrate 41 includes a first area and a second area. An optical waveguide mesa including an optical modulation portion of the semiconductor modulator is formed in the first area of the main surface 41a. A pad electrode for applying a modulated signal to the semiconductor modulator is formed in the second area of the main surface 41a.

Figure 6B:
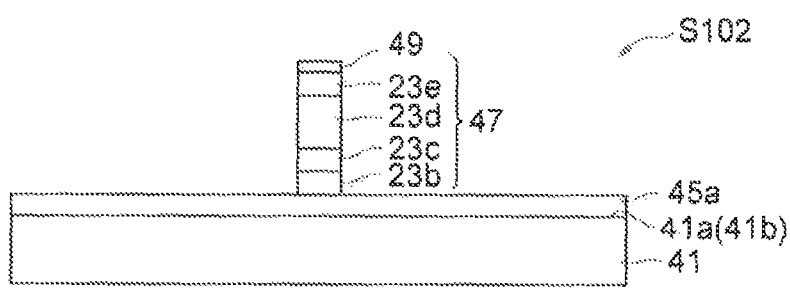

In step S102, as illustrated in FIG. 6B, an optical waveguide mesa 47 is formed on a first area 41b of the main surface 41a of the semiconductor substrate 41. The stacked semiconductor layer 43 is etched to form the optical waveguide mesa 47 including an optical modulation portion of the semiconductor modulator on the first area 41b of the main surface 41a of the semiconductor substrate 41. First, a mask 49 for etching is formed. To form the mask 49, an insulating layer is formed on the stacked semiconductor layer 43, and then a resist mask for defining the pattern of the optical waveguide mesa 47 is formed on the insulating layer. The insulating layer is made of SiN, SiON, or $SiO_2$, for example. The insulating layer is dry-etched using the resist mask to form the mask 49 made of an insulator on the stacked semiconductor layer 43. The stacked semiconductor layer 43 is etched using the mask 49 to form the optical waveguide mesa 47 on the first area 41b of the main surface 41a of the semiconductor substrate 41.

In the present embodiment, a SiN film having a thickness of 200 nm is formed using a (chemical vapor deposition) CVD method, and then a resist mask for defining the pattern of the stripe-shaped semiconductor mesa (the optical waveguide mesa 47) is formed by photolithography. The pattern of the resist mask is then transferred to a SiN film by reactive ion etching (RIE) using $CF_4$ gas to form a SiN mask. After the dry etching, the resist mask is removed by ashing using oxygen ($O_2$) plasma. The n-InP cladding layer (buffer layer) 45b, the core layer 45c, the p-InP cladding layer 45d, and $p^+$-GaInAs contact layer 45e are etched by RIE using the SiN mask and using chlorine gas (for example, $Cl_2$) as an etching gas. Through the etching, the stripe-shaped semiconductor mesa (the optical waveguide mesa 47) is formed on the first area 41b of the main surface 41a of the semiconductor substrate 41. After the etching of the semiconductor, the SiN mask is removed with buffered hydrofluoric acid (BHF).

Figure 6C:
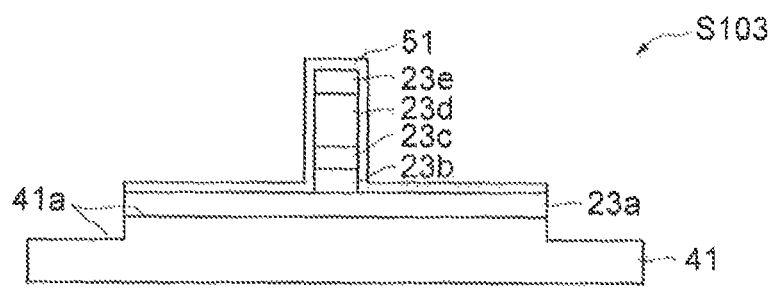

In step S103, as illustrated in FIG. 6C, the remainder of the stacked semiconductor layer 43 is etched to form an isolation mesa 53 of the optical waveguide mesa 47 on the main surface 41a of the semiconductor substrate 41. In an isolation region, the lowest semiconductor layer (for example, the n-InP contact layer) of the stacked semiconductor layer 43 is etched to expose a surface of the semiconductor substrate 41. In the preferred embodiment described above, the semiconductor substrate 41 is formed of semi-insulating InP.

Figure 7A:
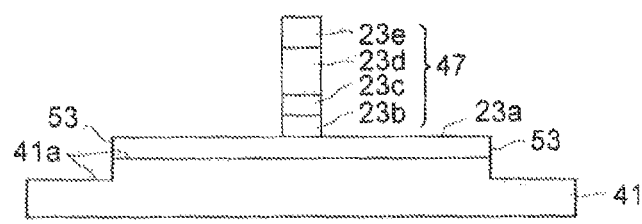
FIGS. 7A to 7C are schematic views of principal steps in a method for manufacturing a semiconductor modulator according to an embodiment of the present invention.

A mask 51 is formed so as to retain a semiconductor layer (for example, the n-InP contact layer) used for applying a modulated signal to the optical waveguide mesa 47. To form the mask 51, an insulating layer is formed on the substrate 41, and then a resist mask for defining the pattern of the isolation mesa 53 is formed. The insulating layer is made of SiN, SiON, or $SiO_2$, for example. The insulating layer is dry-etched using the resist mask to form the mask 51 made of an insulator on the substrate 41. The lowest semiconductor layer (for example, the n-InP contact layer) of the stacked semiconductor layer 43 is etched using the mask 51. Through this etching, the isolation region of the optical waveguide mesa 47 is formed. After the isolation mesa 53 is formed, as illustrated in FIG. 7A, the mask 51 is removed.

In the present embodiment, after the SiN mask used in the formation of the waveguide mesa is removed with buffered hydrofluoric acid (BHF), a SiN film having a thickness of 300 nm is formed using a CVD method. A resist mask having a pattern that defines the isolation region is formed by photolithography. The pattern of the resist mask is transferred to a SiN film by RIE using $CF_4$ gas to form a SiN mask. The resist mask is then removed by ashing using oxygen ($O_2$) plasma. A semiconductor layer having a relatively high conductivity is etched by RIE using the SiN mask as an etching mask and chlorine ($Cl_2$) gas to expose the semi-insulating substrate. After the etching of the semiconductor, the SiN mask is removed by wet etching using buffered hydrofluoric acid (BHF). The total height of the isolation mesa and the waveguide mesa may range from approximately 3.5 to 4.0 μm.

Figure 7B:
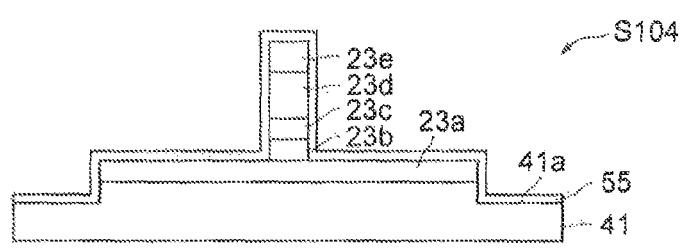

In step S104, after the formation of the isolation mesa 53, as illustrated in FIG. 7B, a first insulating layer 55 is formed on the optical waveguide mesa 47, the isolation mesa 53, and the semiconductor substrate 41. The first insulating layer 55 may be formed of a silicon dioxide ($SiO_2$) film or a silicon nitride (SiN) film.

In the present embodiment, after the SiN mask used for the formation of the isolation mesa is removed, a silicon oxide film having a thickness of approximately 300 nm is formed as a mesa protective film over the entire surface of the substrate using a CVD method.

Figure 7C:
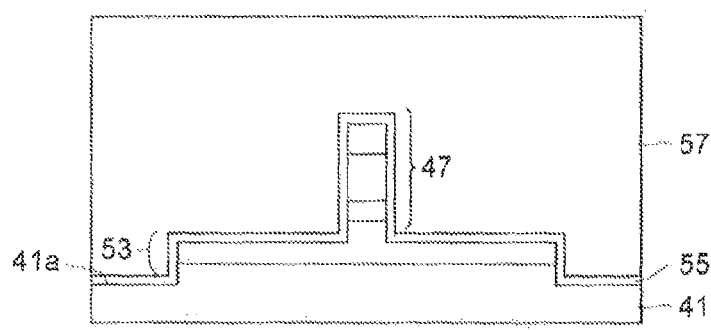

In step S105, as illustrated in FIG. 7C, the optical waveguide mesa 47 is buried within a resin 57 formed on the substrate 41. The resin 57 is composed of benzocyclobutene (BCB) resin, for example. The resin 57 may be applied using a spin coating method. The benzocyclobutene (BCB) resin may be a BCB resin containing silicon (Si).

In step S106, as illustrated in FIGS. 8A and 8B, openings 59 are formed in the resin 57. An electrode for applying a modulated signal to the optical waveguide mesa 47 of the semiconductor modulator is to be formed in the openings 59. The openings 59 include an opening 59A on top of the optical waveguide mesa 47 and an opening 59B on top of the isolation mesa 53. In the embodiment, the openings 59A and 59B serve as a second opening. In step S107, the opening 59A is formed. In step S108, the opening 59B is formed. These openings are formed by etching the resin 57.

In the formation of the opening 59A (for example, formed in a p-region of the optical waveguide mesa 47), a resist mask 61a for defining the position and size of the opening 59A is formed on the benzocyclobutene (BCB) resin by photolithography. The benzocyclobutene (BCB) resin is etched by RIE using the resist mask 61a and a gas mixture of $CF_4$ and $O_2$.

In the formation of the opening 59B (for example, formed in a n-region of the isolation mesa 53), a resist mask 61b for defining the position and size of the opening 59B is formed on the benzocyclobutene (BCB) resin by photolithography. The benzocyclobutene (BCB) resin is etched by RIE using the resist mask 61b and a gas mixture of $CF_4$ and $O_2$. The opening 59B formed in the n-region has a relatively large depth as compared to the opening 59A formed in the p-region. Thus, the formation of the opening 59A in the p-region is preferably followed by the formation of the opening 59B in the n-region. After the formation of the openings, the resist masks 61a and 61b are removed with an organic solvent. FIGS. 8A and 8B are schematic cross-sectional views taken along a line crossing a pair of arm waveguides of the semiconductor modulator (the line III-III in FIG. 1).

In step S109, as illustrated in FIGS. 9A and 9B, an opening 59C is formed in the resin 57 on a second area 41C of the substrate 41. In the embodiment, the opening 59C serves as a first opening. A resist mask 65 having a pattern that defines an opening area for a pad electrode region is formed on the resin 57. The resin 57 is then dry-etched to form the opening 59C in the resin 57. The opening 59C extends to the insulating layer 55 on the second area 41C of the substrate 41. Thus, the insulating layer 55 is exposed through the opening 59C in the resin 57. FIG. 9A is a schematic cross-sectional view taken along the line I-I in FIG. 1. Like FIGS. 8A and 8B, FIG. 9B is a schematic cross-sectional view taken along the line III-III in FIG. 1.

As illustrated in FIG. 9A, the resist mask 64 protects the opening 59A disposed on the optical waveguide mesa 47 on the first area 41b and the opening 59B disposed on the isolation mesa 53.

In the present embodiment, the resist mask 64 is formed on the benzocyclobutene (BCB) resin by photolithography, and then the benzocyclobutene (BCB) resin in a pad electrode forming region is removed by RIE using the resist mask 64 and a gas mixture of $CF_4$ and $O_2$ to form an opening. The opening is processed using the following method so as not to affect the high-frequency characteristics of the semiconductor modulator. For example, in the formation of an opening (for example, opening 59C on the second area 41C) in the benzocyclobutene (BCB) resin, the benzocyclobutene (BCB) resin is etched under a first condition at a gas flow ratio $CF_4:O_2=1:1$ using the resist mask 64 having a pattern defining the opening (for example, opening 59C) (step of the first etching of the resin). The ashing of the resist is then performed under a second condition at a gas flow ratio $CF_4:O_2=1:5$ to enlarge the opening in the resist mask 64 (step of the selective etching of the resist). Simultaneously, the side surface of the opening is inclined. The benzocyclobutene (BCB) resin is etched again under the first condition at a gas flow ratio $CF_4:O_2=0.1:1$ using the mask having the enlarged opening (step of the second etching of the resin). When the benzocyclobutene (BCB) resin is a BCB resin containing silicon (Si), the etch rate of the benzocyclobutene (BCB) resin is appropriately controlled by altering the gas flow ratio of $CF_4$ to $O_2$. When the benzocyclobutene (BCB) resin is etched by RIE using a gas mixture of $CF_4$ and $O_2$, Si atoms in the benzocyclobutene (BCB) resin react with $O_2$ in the etching gas and form $SiO_2$. $SiO_2$ is removed by $CF_4$ in the etching gas, thereby etching the benzocyclobutene (BCB) resin. The etch rate of the benzocyclobutene (BCB) resin increases with increasing gas flow ratio of $CF_4$ to $O_2$. Because of ashing with $O_2$ gas, the etch rate of the resist increases with decreasing gas flow ratio of $CF_4$ to $O_2$. Thus, the benzocyclobutene (BCB) resin and the resist can be selectively etched by controlling the gas flow ratio of $CF_4$ to $O_2$. This step of forming the opening can be successively performed in a chamber of a RIE apparatus only by changing the gas flow ratio of gas flow ratio of $CF_4$ to $O_2$. If necessary, this step may be repeatedly performed. When the benzocyclobutene (BCB) resin is a BCB resin containing silicon (Si), the etch rates of the benzocyclobutene (BCB) resin and the resist can be controlled by altering the gas flow ratio of $CF_4$ to $O_2$. The side surface of the opening 59C in the benzocyclobutene (BCB) resin is inclined at an angle AOL of approximately 45 to 70 degrees with respect to the main surface 41a of the semiconductor substrate 41 using this etching method. After the completion of the processing, the resist mask 64 is removed with an organic solvent, such as acetone, for example.

As illustrated in FIG. 9B, the optical waveguide mesa 47 includes a second portion extending in the second area 41C. The second portion of the optical waveguide mesa 47 is configured to transmit light from an optical input port to an optical waveguide of the semiconductor modulator and from the optical waveguide of the semiconductor modulator to an optical output port. Like the first portion, the second portion of the optical waveguide mesa 47 includes the first cladding layer 23b, the core layer 23c, and the second cladding layer 23d. The core layer 23c is disposed between the first cladding layer 23b and the second cladding layer 23d. The thickness W1 of the resin 57 on the second portion of the optical waveguide mesa 47 is set to be 2 micrometers or more. In order to reduce the capacitive coupling between a metal wire over the optical waveguide mesa 47 and the optical waveguide mesa 47, the thickness W1 of the resin 57 on the optical waveguide mesa 47 is preferably in this range.

In step S110, the first insulating layer 55 in the openings 59A and 59B in the resin 57 is removed by etching. After the opening 59C is formed in the resin 57, the insulating layer 55 exposed through the openings 59A, 59B, and 59C is removed. In the present embodiment, the insulating layer in the openings 59A, 59B, and 59C is removed by etching without forming an additional mask. The resin 57 is used as the mask. The $SiO_2$ film exposed through the openings 59A and 59B is removed by RIE using $CF_4$ gas. In this etching, the $SiO_2$ film in the pad electrode forming region exposed through the opening 59C is also etched, thereby exposing the substrate main surface.

In step S111, an electrode for applying a modulated signal to the optical waveguide mesa 47 of the semiconductor modulator is formed. First, as illustrated in FIGS. 10A and 10B, ohmic electrodes 65a and 65b are formed in the openings 59A and 59B, respectively, for example, using a lift-off method. A resist mask for lift-off is formed. This resist mask has a pattern that defines the position and shape of the ohmic electrodes. After the resist mask is formed, an electrically conductive film (metal) for forming the ohmic electrodes is formed by evaporation. The resist mask is removed to form patterned electrically conductive films (ohmic electrodes). No ohmic electrode is formed in the opening 59C.

In step S112, as illustrated in FIGS. 11A and 11B, an underlayer structure 67 for forming a pad electrode is formed in the second area 41C of the substrate 41. The underlayer structure 67 is in contact with the second area 41C of the substrate 41. The underlayer structure 67 includes an insulating layer (second insulating layer) made of a dielectric material such as SiN, SiON, and $SiO_2$. The insulating layer in the underlayer structure 67 has a thickness of 200 nm or more, for example. This manufacturing method can reduce leakage current resulting from a structure disposed under the pad electrode.

After the first insulating layer 55 is etched, in the step S112, a second insulating layer is formed on the resin 57 and the substrate 41, for example, using a CVD method. The second insulating layer is in contact with the second area 41C of the substrate 41. The underlayer structure 67 includes the second insulating layer on the second area 41C. This second insulating layer functions as the underlayer structure 67. In the following description, the reference numeral 67 also denotes the second insulating layer. The second insulating layer 67 is formed on the substrate 41 as well as on the resin 57 and is in contact with the second area 41C of the substrate 41. The second insulating layer 67 adheres firmly to the substrate 41.

In the present embodiment, the second insulating layer 67 preferably includes at least one of a silicon oxide film and a silicon nitride film. The benzocyclobutene (BCB) resin adheres well to a silicon oxide film and a silicon nitride film. A silicon oxide film and a silicon nitride film also adhere well to an InP semiconductor.

In one embodiment, a $SiO_2$ film is formed over the entire surface of the substrate. In order to prevent the $SiO_2$ film from separating from the benzocyclobutene (BCB) resin, the $SiO_2$ film is preferably composed of a low-stress film. In order to form an opening pattern on the ohmic electrodes, a resist mask is formed by photolithography. An opening is formed in the $SiO_2$ film on the ohmic electrodes by RIE using the resist mask and $CF_4$ gas.

Figure 12A:
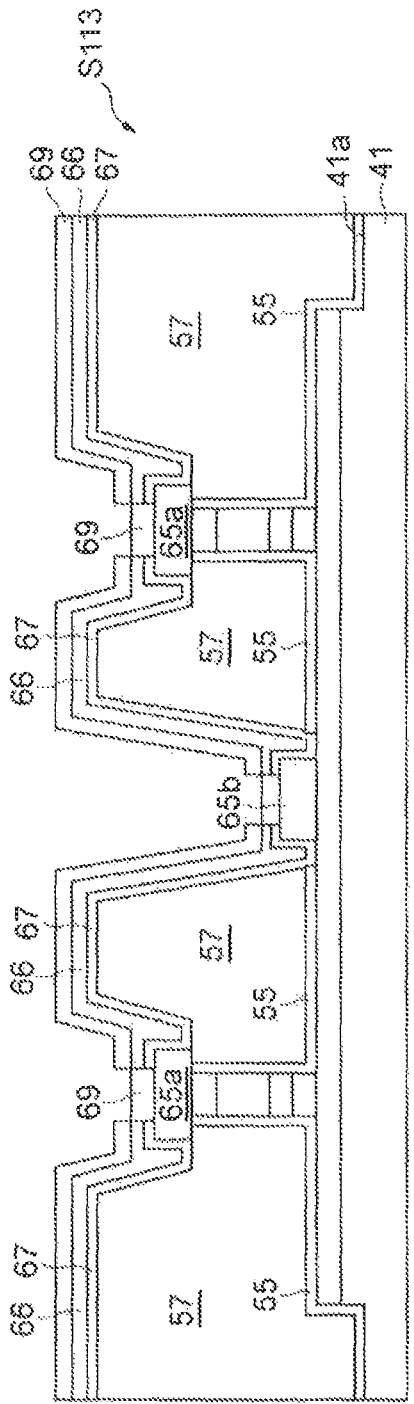
FIGS. 12A and 12B are schematic views of principal steps in a method for manufacturing a semiconductor modulator according to an embodiment of the present invention.
Figure 12B:
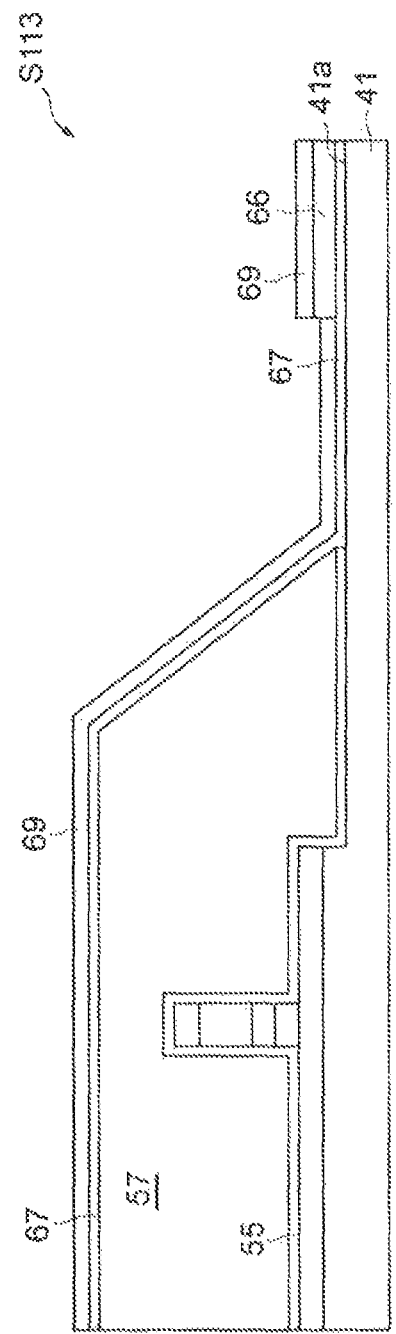

In the present embodiment, after the insulating layer serving as the underlayer structure 67 is formed, a pad electrode and a metal wire are formed using a plating method. In step S113, as illustrated in FIGS. 12A and 12B, a seed layer 69 having a pattern that defines the pad electrode and the metal wire is formed on top of the resin 57 and the substrate 41. In one embodiment, in order to form the seed layer 69, first, a resist mask 66 having a pattern that defines the pad electrode and the metal wire is formed. A metal layer is formed on the resist mask 66. The metal layer may be formed of an electric conductor, such as TiW. The seed layer 69 (patterned metal layer) is formed in an opening in the resist mask 66. The seed layer 69 is not connected to and is separated from the metal layer disposed on the resist mask 66. The seed layer 69 is in contact with the second insulating layer of the underlayer structure 67. Thus, the second insulating layer 67 is formed on the side surface(s) and top surface of the resin in the openings 59A and 59B and on the second area 41C of the substrate 41. In addition, the opening 59C of the resin is formed by dry etching including the steps of the first etching of the resin, the selective etching of the resist, and the second etching of the resin. The opening 59C of the resin has a taper-shaped side surface. The second insulating layer 67 is also formed on the taper-shaped side surface of the opening 59C. The seed layer 69 is formed on the second insulating layer 67. The seed layer 69 is also formed on the ohmic electrodes 65a and 65b.

Figure 14A:
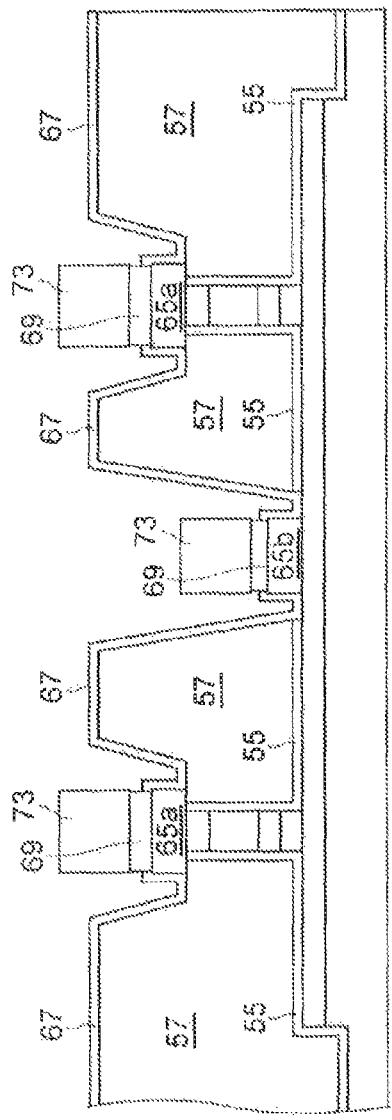
FIGS. 14A and 14B are schematic views of principal steps in a method for manufacturing a semiconductor modulator according to an embodiment of the present invention.
Figure 14B:
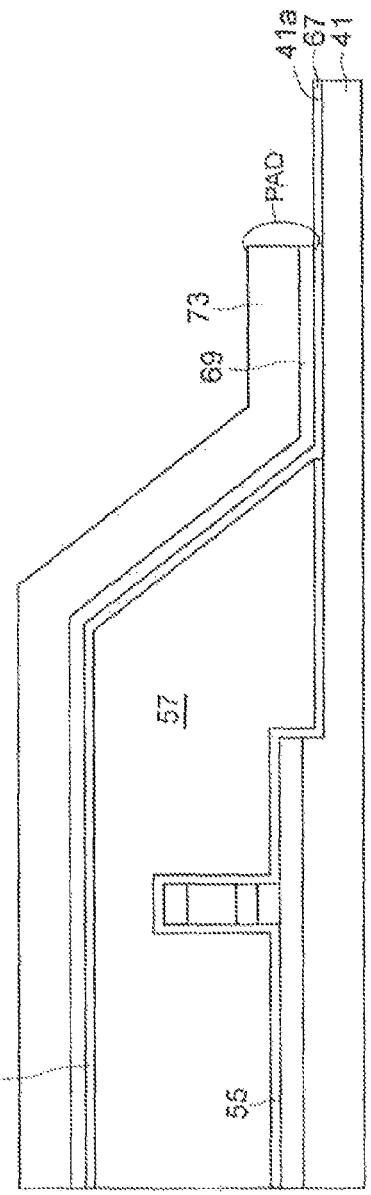

In step S114, as illustrated in FIGS. 13A and 13B, an electrode 73 is formed using a plating method. The electrode 73 is made of gold (Au), for example. As illustrated in FIGS. 14A and 14B, a Au plating pattern corresponding to the seed layer 69 is formed. Through these steps, the pad electrode PAD (69, 73) is formed in contact with the underlayer structure 67.

The pad electrode PAD (69, 73) is formed in the opening 59C in the resin 57. Thus, the pad electrode PAD (69, 73) is disposed on the outside of the resin 57. The underlayer structure 67 formed of dielectric material such as SiN, SiON, and $SiO_2$ is in contact with the second area 41C of the substrate 41 and is in contact with the pad electrode PAD (69, 73). This can ensure adhesion of the pad electrode PAD (69, 73).

Through these steps, the pad structure as illustrated in FIG. 4A is formed.

FIG. 15 is a flow chart of principal steps in another method for manufacturing a semiconductor modulator according to an embodiment of the present invention.

FIGS. 16A and 16B are schematic cross-sectional views of step S116 after the steps S101 to S104. FIGS. 16A and 16B are schematic cross-sectional views taken along the line VI-VI in FIG. 1A. The schematic cross-sectional view in FIG.

16A corresponds to the step illustrated in FIG. 7A. The schematic cross-sectional view in FIG. 16B corresponds to the step illustrated in FIG. 7B. In the cross section illustrated in FIG. 16B, an insulating layer 55 is formed also in the second area 41C of the substrate 41 as an underlayer structure for forming a pad electrode.

Figure 17A:
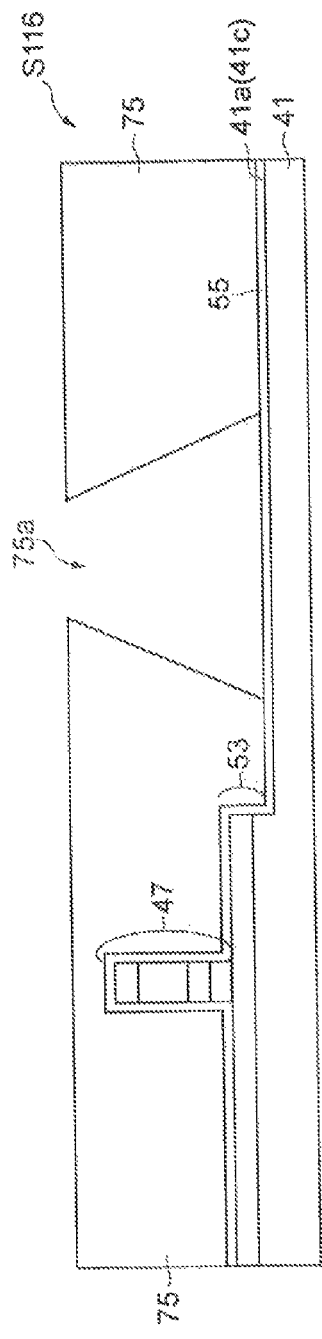
FIGS. 17A and 17B are schematic views of principal steps in a method for manufacturing a semiconductor modulator according to another embodiment of the present invention.

In step S116, after an optical waveguide mesa 47 and an isolation mesa 53 are formed, the optical waveguide mesa 47 and the isolation mesa 53 are buried within a resist applied to the entire surface of the substrate 41, for example, using a spin coating method. As illustrated in FIG. 17A, a resist mask 75 for lift-off is then formed from the resist. An opening 75a having a reverse tapered side surface is formed using the lift-off resist. The resist mask 75 has the opening 75a at the position where a metal body serving as an underlayer structure is to be formed. The insulating layer 55 is exposed through the opening 75a. In order to protect the optical waveguide mesa 47, patterning is preferably performed after a resist having a thickness of 4 µm or more is formed.

Figure 17B:
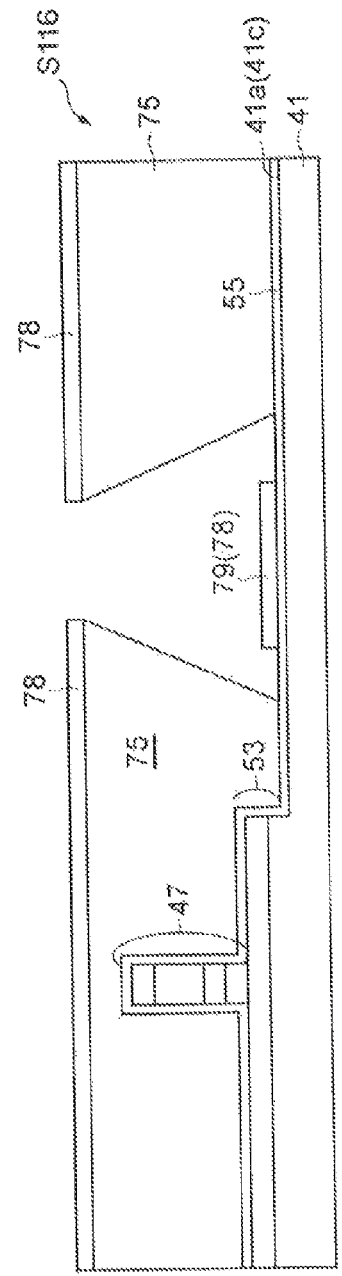
Figure 18A:
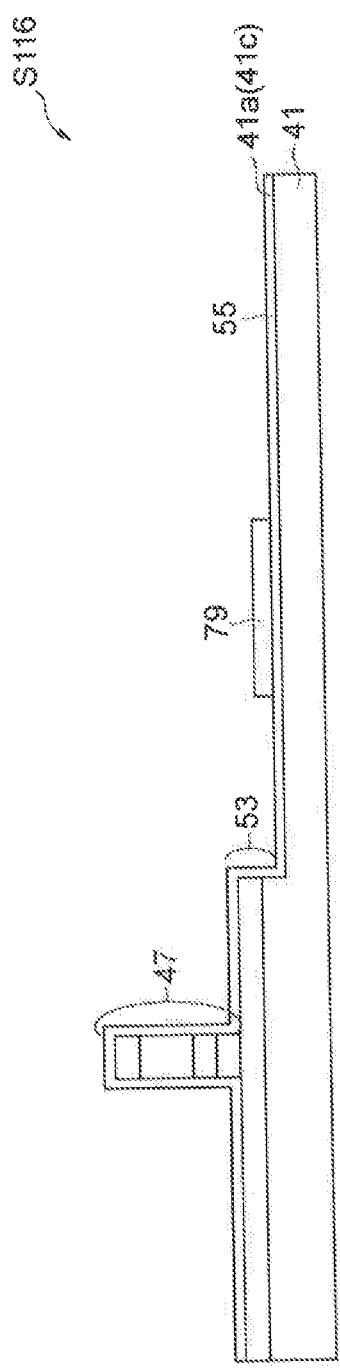
FIGS. 18A and 18B are schematic views of principal steps in a method for manufacturing a semiconductor modulator according to another embodiment of the present invention.

After the resist mask 75 is formed, as illustrated in FIG. 17B, a metal layer 78 is formed, for example, using a vacuum evaporation method. The metal layer 78 is formed on the insulating layer 55 in the opening 75a as well as on the resist mask 75. In the present embodiment, the metal layer 78 is formed of Ti/Pt/Au. The resist mask 75 is removed with an organic solvent. As illustrated in FIG. 18A, a metal body 79 is formed on the second area 41C by lift-off. After the lift-off, the residue on the substrate 41 is removed using O₂ plasma.

As illustrated in FIG. 18A, the metal body 79 is formed on the insulating layer 55 as a part of an underlayer structure. The insulating layer 55 is formed of a dielectric material such as SiN, SiON, and SiO₂. In this embodiment, the underlayer structure includes the insulating layer 55 and the metal body 79 disposed on the second area 41C. The insulating layer 55 of the underlayer structure is in contact with the second area 41C. In addition, the insulating layer 55 is in contact with the metal body 79. The metal body 79 supports a pad electrode that is formed in a later step.

As is apparent from the above description, the step of forming the underlayer structure on the second area 41C of the substrate 41 includes the steps S104 and S116. The first insulating layer 55 and the metal body 79 are formed before the resin 57 is applied. Thus, the structure including the insulating layer 55 and the metal body 79 in the second area 41C of the substrate 41 provides an underlayer structure on which the pad electrode is to be formed.

Figure 18B:
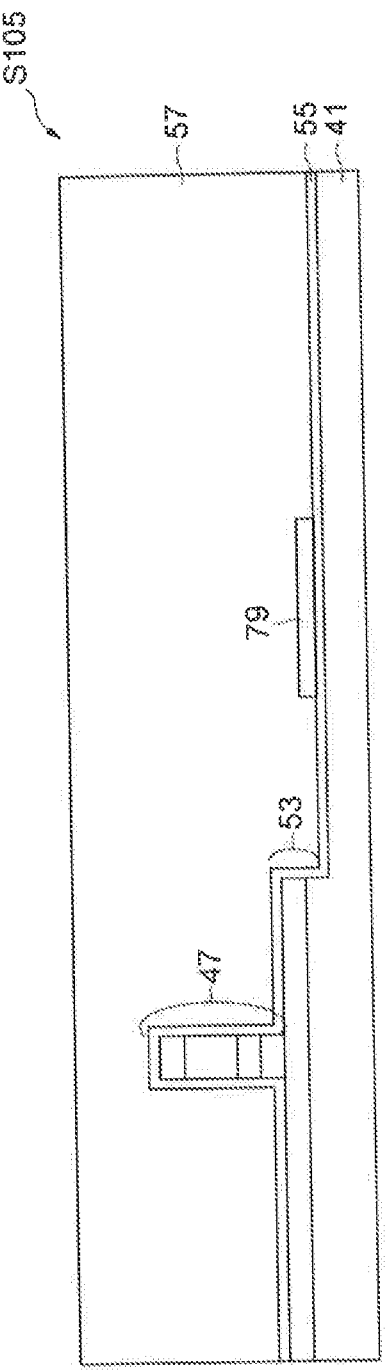

In step S105, as illustrated in FIG. 18B, the optical waveguide mesa 47 and the isolation mesa 53 are buried within the resin 57. After the formation of the resin 57 in the step S105, openings 59A and 59B are formed in the resin 57 in step S106 (step S107 and step S108).

In the subsequent step S109, as illustrated in FIG. 19A, an opening 59C is formed in the resin 57 in the second area 41C of the substrate 41 using a mask 64.

After the mask 64 is removed, the insulating layer 55 in the openings 59A and 59B is removed by etching to expose the top surface of the optical waveguide mesa 47. In the step S109, as illustrated in FIG. 19B, the opening 59C is disposed in the second area 41C of the substrate 41. The openings 59A and 59B are covered with the mask 64. The metal body 79 is exposed through the opening 59C. The insulating layer 55 is covered with the metal body 79 in the opening 59C. Thus, the insulating layer 55 is not etched in the second area 41C.

The resin 57 is disposed on at least a portion of the edge of the metal body 79. The edge of the metal body 79 is disposed between the insulating layer 55 and the resin 57. Since the top surface of the metal body 79 is in contact with the resin 57, the metal body 79 is fixed onto the insulating layer 55 of the underlayer structure. The resin 57 presses down the metal body 79.

In step S111, as illustrated in FIG. 20A, ohmic electrodes of the modulator are formed while the second area 41C is protected with the resist 81.

In step S117, a third insulating layer 83 is formed on the metal body 79 and the resin 57, for example, using a CVD method. The third insulating layer 83 is formed of a silicon oxide film or a silicon nitride film. The silicon oxide film or the silicon nitride film adheres well to the InP semiconductor. The third insulating layer 83 is then patterned to form an opening 83a on the metal body 79. The top surface of the metal body 79 is in contact with the third insulating layer 83. As illustrated in FIG. 20I, the opening 59C in the resin 57 has a greater size than the opening 83a in the third insulating layer 83 on the metal body 79. The top surface of the metal body 79 is in contact with the third insulating layer 83. Thus, the metal body 79 is fixed onto the insulating layer 55 of the underlayer structure. The third insulating layer 83 presses down the metal body 79.

Figure 21A:
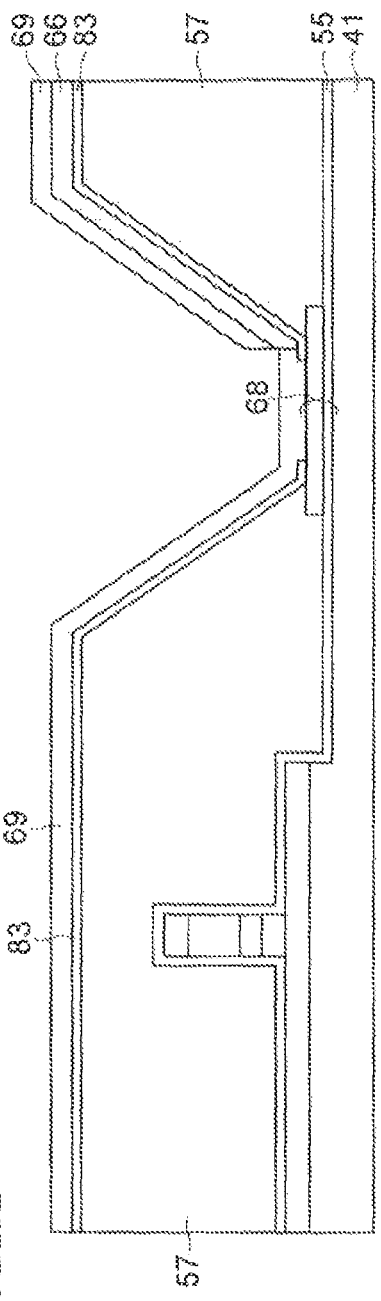
FIGS. 21A and 21B are schematic views of principal steps in a method for manufacturing a semiconductor modulator according to another embodiment of the present invention.

In the present embodiment, after the insulating layer constituting an underlayer structure 68 is formed, a pad electrode and a metal wire are formed using a plating method. In the embodiment, the underlayer structure 68 includes the third insulating layer 83 on the metal body 79 in addition to the insulating layer 55 and the metal body 79. As mentioned above, the resin 57 is disposed on at least a portion of the edge of the metal body 79. The edge of the metal body 79 is disposed between the insulating layer 55 and the resin 57. In step S113, as illustrated in FIG. 21A, a seed layer 69 having a pattern that defines the pad electrode and the metal wire is formed on top of the resin 57 and the substrate 41. In one embodiment, in order to form the seed layer 69, a resist mask 66 having a pattern that defines the pad electrode and the metal wire is formed. A metal layer is formed on the resist mask 66. The metal layer is preferably formed of an electric conductor, such as TiW. The seed layer 69 (patterned metal layer) is formed in an opening in the resist mask 66. The seed layer 69 is not connected to and is separated from the metal layer disposed on the resist mask 66. The seed layer 69 is in contact with the third insulating layer 83 of the underlayer structure 68. Thus, the third insulating layer 83 is formed on the side surface(s) and top surface of the resin in the openings 59A and 59B and on the underlayer structure 68 (metal body 79) in the second area 41C of the substrate 41. In addition, the opening 59C of the resin is formed by dry etching including the steps of the first etching of the resin, the selective etching of the resist, and the second etching of the resin. The opening 59C of the resin has a taper-shaped side surface. The third insulating layer 83 is also formed on the taper-shaped side surface of the opening 59C. The seed layer 69 is formed on the third insulating layer 83. The seed layer 69 is also formed on ohmic electrodes 65a and 65b.

Figure 21B:
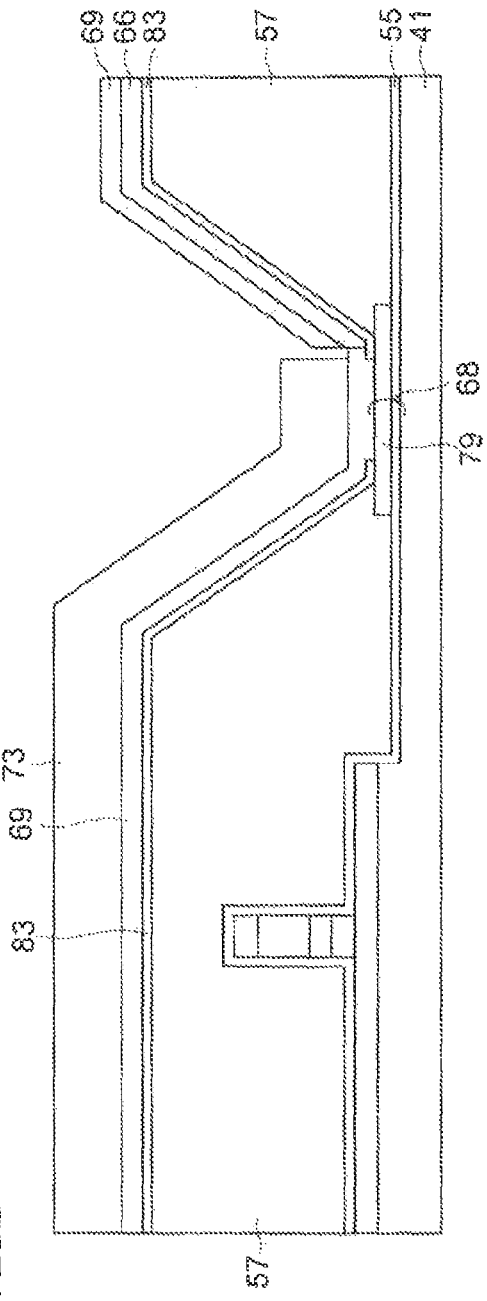

In step S114, as illustrated in FIG. 21B, an electrode 73 is formed using a plating method. The electrode 73 is made of gold (Au), for example. In the step S114, a Au plating pattern corresponding to the seed layer 69 is formed. Through these steps, the pad electrode PAD (69, 73) is formed in contact with the underlayer structure 68. An unnecessary seed layer is removed by dry etching, and then the underlayer resist is removed with an organic solvent.

The pad electrode PAD (69, 73) is formed in the opening 59C in the resin 57. Thus, the pad electrode PAD (69, 73) is disposed on the outside of the resin 57. The underlayer structure 68 is in contact with the second area 41C of the substrate 41 and is in contact with the pad electrode PAD (69, 73). This can ensure adhesion of the pad electrode PAD (69, 73).

Through these steps, as illustrated in FIG. 22A, a mesa waveguide of the semiconductor modulator is formed in the first area 41b. Furthermore, a pad structure as illustrated in FIG. 4B or 22B is formed. The pad electrode PAD (69, 73) is exposed through the opening 59C of the resin 57.

The present invention is not limited to the specific structures disclosed in the present embodiments.

What is claimed is:

1. A method for manufacturing a semiconductor modulator, comprising the steps of:
    preparing a substrate having a main surface including a first area and a second area arranged in a direction of a first axis;
    forming a stacked semiconductor layer on the main surface of the substrate;
    forming a mask on a surface of the stacked semiconductor layer;
    forming an optical waveguide mesa by etching the stacked semiconductor layer using the mask, the optical waveguide mesa including a first portion having an optical modulation portion and a second portion;
    forming a first insulating layer on a top surface and a side surface of the optical waveguide mesa and on the second area of the substrate;
    after forming the first insulating layer, applying a resin on the first insulating layer;
    forming a first opening in the resin on the second area of the substrate;
    etching the first insulating layer through the first opening by using the resin as a mask to expose the substrate in the second area thereof;
    after etching the first insulating layer, forming a second insulating layer on the resin and on the exposed substrate to provide an underlayer structure on the second area of the substrate in contact with the substrate; and
    forming a pad electrode on the underlayer structure in contact with the underlayer structure through the first opening of the resin,
    wherein the underlayer structure includes the second insulating layer and the second insulating layer is made of a dielectric material.

2. The method for manufacturing a semiconductor modulator according to claim 1, wherein the second insulating layer of the underlayer structure has a thickness of 200 nm or more.

3. The method for manufacturing a semiconductor modulator according to claim 1, wherein the substrate is made of semi-insulating InP, and the stacked semiconductor layer includes a plurality of semiconductor layers composed of a III-V group compound semiconductor.

4. The method for manufacturing a semiconductor modulator according to claim 1, further comprising the steps of:
    forming a second opening in the resin disposed on the first portion of the optical waveguide mesa;
    forming an electrode in the second opening, the electrode being in contact with the optical waveguide mesa through the second opening; and
    forming a metal wire on the resin, the metal wire connecting the pad electrode to the electrode in the second opening, wherein
    the first portion of the optical waveguide mesa includes a first cladding layer formed of a first-conductive-type semiconductor, a core layer formed of an undoped semiconductor, and a second cladding layer formed of a second-conductive-type semiconductor,
    the first portion of the optical waveguide mesa and the metal wire extend in a direction of the first axis,
    the second portion of the optical waveguide mesa extends in a direction of a second axis crossing the first axis, and
    the resin is disposed between the metal wire and the second portion of the optical waveguide mesa at a portion intersecting between the metal wire and the second portion of the optical waveguide mesa.

5. The method for manufacturing a semiconductor modulator according to claim 4, wherein
    the second portion of the optical waveguide mesa includes the first cladding layer, the core layer, and the second cladding layer, and
    the resin in the portion intersecting between the metal wire and the second portion of the optical waveguide mesa has a thickness of 2 micrometers or more.

6. The method for manufacturing a semiconductor modulator according to claim 4,
    wherein the second insulating layer is in contact with the substrate in the second area.

7. The method for manufacturing a semiconductor modulator according to claim 6, further comprising the step of:
    forming a seed layer on the second insulating layer formed on the resin and the substrate, the seed layer having a pattern for forming the pad electrode and the metal wire, wherein
    the seed layer is in contact with the second insulating layer, and
    the pad electrode and the metal wire are formed using a plating method using the seed layer.

8. The method for manufacturing a semiconductor modulator according to claim 1, wherein the step of forming the first opening in the resin on the second area of the substrate includes the steps of:
    forming a resist mask on the resin, the resist mask defining the first opening,
    performing first etching of the resin using the resist mask,
    selectively etching the resist mask after the first etching of the resin, and
    performing second etching of the resin after etching the resist mask.

9. The method for manufacturing a semiconductor modulator according to claim 8, wherein
    the resin is composed of a benzocyclobutene resin containing silicon,
    the second insulating layer includes at least one of a silicon oxide film and a silicon nitride film,
    the first etching of the resin, the etching of the resist mask, and the second etching of the resin are performed through RIE using a gas mixture of $CF_4$ and $O_2$, and
    the steps of performing the first etching, selectively etching the resist mask, and performing the second etching are successively performed in a RIE apparatus by changing the gas flow ratio of $CF_4$ to $O_2$.

10. A method for manufacturing a semiconductor modulator comprising the steps of:
    preparing a substrate having a main surface including a first area and a second area arranged in a direction of a first axis;
    forming a stacked semiconductor layer on the main surface of the substrate;
    forming a mask on a surface of the stacked semiconductor layer;
    forming an optical waveguide mesa by etching the stacked semiconductor layer using the mask, the optical waveguide mesa including a first portion having an optical modulation portion and a second portion;

applying a resin on a top surface and a side surface of the optical waveguide mesa and on the substrate;

forming a first opening in the resin on the second area of the substrate;

forming an underlayer structure on the second area of the substrate in contact with the substrate; and forming a pad electrode on the underlayer structure in contact with the underlayer structure through the first opening of the resin, wherein the step of forming the underlayer structure in the second area of the substrate includes the steps of:

forming a first insulating layer on the top surface and the side surfaces of the optical waveguide mesa and on the substrate before the resin is applied, and forming a metal body on the first insulating layer in the second area of the substrate before the resin is applied, and wherein the pad electrode is exposed through the first opening of the resin, and the metal body supports the pad electrode.

11. The method for manufacturing a semiconductor modulator according to claim 10, wherein the resin is disposed on at least a portion of an edge of the metal body in contact with a surface of the metal body, and the edge of the metal body is disposed between the first insulating layer and the resin.

12. The method for manufacturing a semiconductor modulator according to claim 10, further comprising the steps of:

forming a second insulating layer on the metal body and the resin; and forming an opening in the second insulating layer on the metal body by etching the second insulating layer, wherein the top surface of the metal body is in contact with the second insulating layer, and the first opening of the resin has a greater size than the opening in the second insulating layer on the metal body.

13. The method for manufacturing a semiconductor modulator according to claim 12, wherein the resin is composed of a benzocyclobutene resin, and the second insulating layer is made of silicon oxide or silicon nitride.

* * * * *